(12) United States Patent
Govorkov et al.

(10) Patent No.: US 7,760,788 B2
(45) Date of Patent: *Jul. 20, 2010

(54) BANDWIDTH-LIMITED AND LONG PULSE MASTER OSCILLATOR POWER OSCILLATOR LASER SYSTEMS

(75) Inventors: Sergei V. Govorkov, Mountain View, CA (US); Alexander O. W. Wiessner, Goettingen (DE); Timur V. Misyuryaev, Goettingen (DE); Alexander Jacobson, Hollywood, FL (US); Gongxue Hua, Unionville, CT (US); Rainer Paetzel, Dransfeld (DE); Thomas Schroeder, Goettingen (DE); Hans-Stephan Albrecht, Goettingen (DE)

(73) Assignee: Coherent, Inc., Santa Clara, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/170,249

(22) Filed: Jul. 9, 2008

(65) Prior Publication Data

US 2008/0291962 A1 Nov. 27, 2008

Related U.S. Application Data

(63) Continuation of application No. 11/142,648, filed on Jun. 1, 2005, now Pat. No. 7,418,022.

(60) Provisional application No. 60/586,768, filed on Jul. 9, 2004.

(51) Int. Cl.
*H01S 3/22* (2006.01)
(52) U.S. Cl. .............................. 372/55; 372/57; 372/100
(58) Field of Classification Search .................. 372/55, 372/57

See application file for complete search history.

(56) References Cited

U.S. PATENT DOCUMENTS

| 4,914,663 | A | 4/1990 | Basu et al. ..................... 372/18 |
| 4,941,147 | A | 7/1990 | Bhowmik ..................... 372/94 |
| 5,305,334 | A | 4/1994 | Margalit et al. ............... 372/32 |
| 5,796,513 | A | 8/1998 | Stamm et al. ............... 359/330 |
| 5,852,627 | A | 12/1998 | Ershov ....................... 372/108 |
| 6,229,829 | B1 | 5/2001 | Yin ............................. 372/22 |
| 6,282,223 | B1 | 8/2001 | Angeley ...................... 372/92 |
| 6,345,065 | B1 | 2/2002 | Kleinschmidt et al. ......... 372/57 |
| 6,625,192 | B2 | 9/2003 | Arbel et al. ................... 372/69 |
| 6,721,344 | B2 | 4/2004 | Nakao et al. .................. 372/55 |
| 7,418,022 | B2 * | 8/2008 | Govorkov et al. ............. 372/55 |
| 2002/0031158 | A1 | 3/2002 | Kleinschmidt ............... 372/55 |
| 2002/0075932 | A1 | 6/2002 | Stamm ........................ 372/57 |

(Continued)

FOREIGN PATENT DOCUMENTS

DE 42 19 169 A1 6/1992

*Primary Examiner*—Dung T Nguyen
(74) *Attorney, Agent, or Firm*—Morrison & Foerster LLP

(57) ABSTRACT

Laser systems have a line-narrowed master oscillator and a power oscillator for amplifying the output of the master oscillator. The power oscillator includes optical arrangements for limiting the bandwidth of radiation that can be amplified. The limited amplification bandwidth of the power oscillator is relatively broad compared to that of the output of the master oscillator, but narrower than would be the case without the bandwidth limiting arrangements. The bandwidth narrowing arrangements of the power oscillator function primarily to restrict the bandwidth of amplified spontaneous emission generated by the power oscillator.

18 Claims, 15 Drawing Sheets

U.S. PATENT DOCUMENTS

| | | | |
|---|---|---|---|
| 2002/0105995 A1 | 8/2002 | Govorkov et al. | 372/57 |
| 2003/0142714 A1 | 7/2003 | Yamashita et al. | 372/55 |
| 2003/0219056 A1 | 11/2003 | Yager et al. | 372/57 |
| 2004/0057489 A1 | 3/2004 | Fallon et al. | 372/57 |

* cited by examiner

FIG. 11
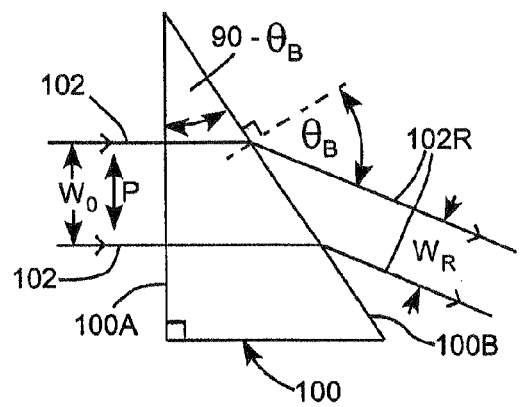
FIG. 12
FIG. 12A
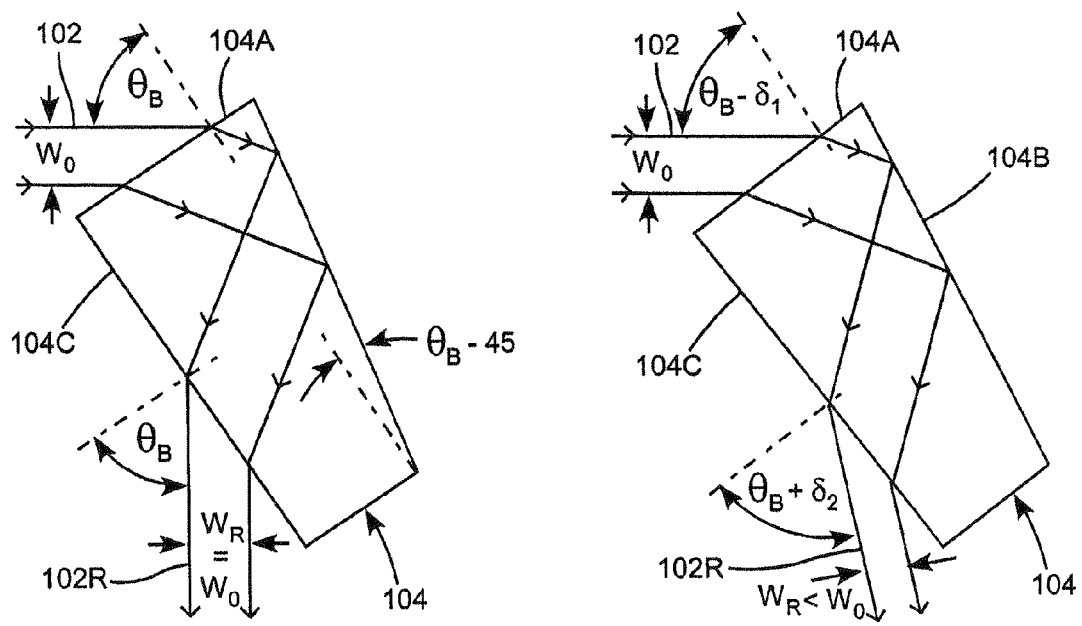

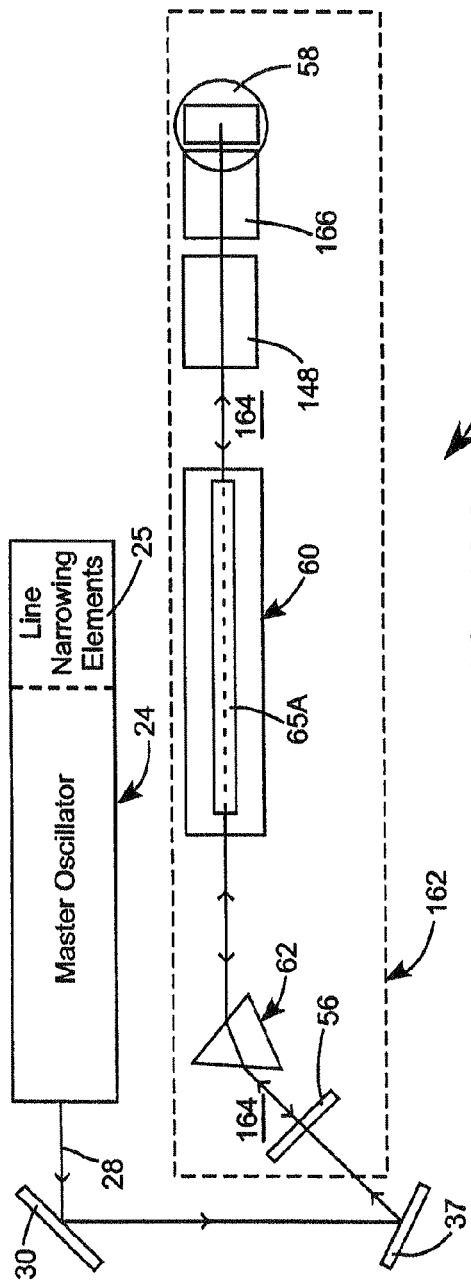
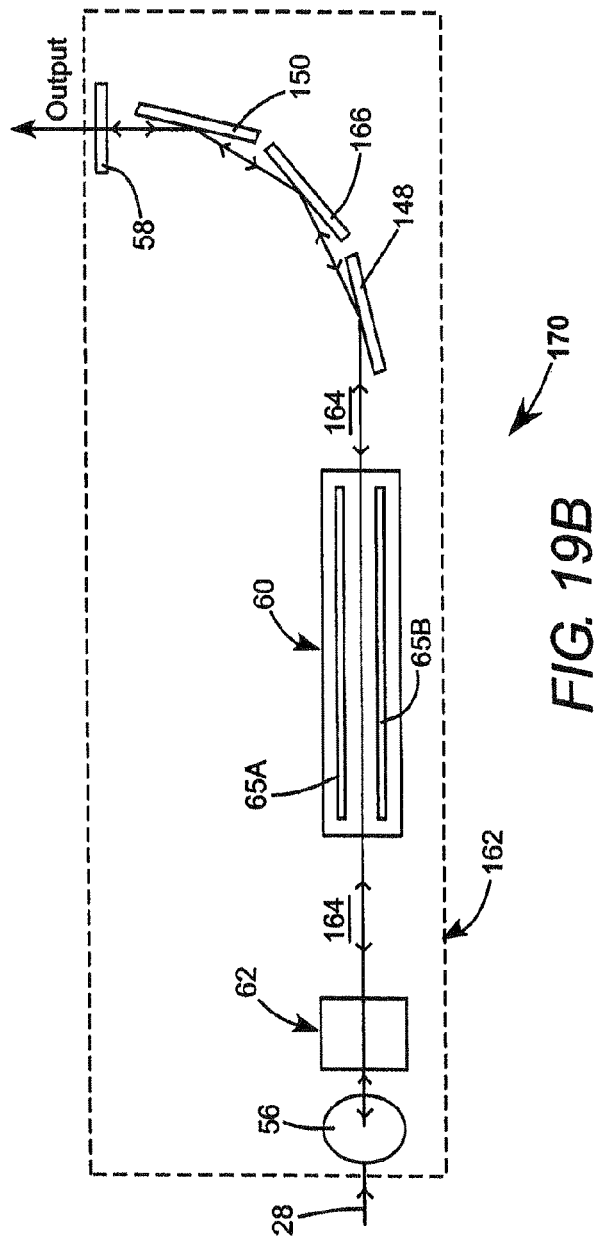

BANDWIDTH-LIMITED AND LONG PULSE MASTER OSCILLATOR POWER OSCILLATOR LASER SYSTEMS

PRIORITY

This application is a continuation of U.S. patent application Ser. No. 11/142,648, filed Jun. 1, 2005, now U.S. Pat. No. 7,418,022 which in turn claims priority from U.S. Provisional Application Ser. No. 60/586,768, filed Jul. 9, 2004, the disclosures of which are incorporated herein in their entirety by reference.

TECHNICAL FIELD OF THE INVENTION

The present invention relates generally to master oscillator, power oscillator (MOPO) laser systems. The invention relates in particular to molecular fluorine ($F_2$) or excimer MOPO laser systems including arrangements for spectral narrowing, long pulse generation, extending component lifetime, or reduction of amplified spontaneous emission (ASE).

DISCUSSION OF BACKGROUND ART

Excimer lasers including MOPO systems and master oscillator power amplifier (MOPA) systems are extensively used as light sources for UV microlithography in the manufacture of state-of-the-art semiconductor integrated circuits. Such excimer lasers have to satisfy challenging and often mutually conflicting technical requirements, due to an ever-increasing demand for smaller critical dimensions of the integrated circuits, together with higher production throughput and reduced running cost of UV microlithography systems. Important requirements of an excimer laser for UV microlithography include high output power and pulse energy, long output pulse duration, narrow spectral bandwidth and high spectral purity of the output beam, and high reliability and long lifetime of components.

One reason for the long pulse requirement is that optical damage induced in the projection lens of a UV microlithography system (step-and-repeat system or "stepper"), depends on the peak intensity of laser light in light-pulses delivered by the excimer laser. Reducing peak intensity while still maintaining average power in the pulses can extend the lifetime of a projection lens without reducing system throughput. Since average power, pulse repetition rate and beam size in the projection lens are properties of the laser and can not be changed easily, peak intensity is typically reduced by extending the duration of a laser pulse after it is delivered by the laser, and before it is delivered to the projection lens. This is accomplished through the use of what is known in the art as a passive pulse-stretcher, the pulse stretcher being located at the laser output.

Such a passive pulse-stretcher typically consists of a beam splitter and several mirrors for beam folding and imaging. The mirrors form an optical delay line. Some of the light in a pulse input to the pulse stretcher is transmitted through the beam splitter, and some of the light is reflected. The reflected light is sent through the delay line and, after one round trip through the delay line, returns to the beam splitter. There, some of the light is transmitted, while some of the light is reflected and sent through the delay line again. Such a pulse stretcher consequently generates a train of pulses, each thereof having a fraction of the energy of the originally input pulse, and which are separated temporally by the round trip time of the delay line.

One limitation the passive pulse-stretcher is that it is energy inefficient. This is due to scatter and absorption losses at the beamsplitter and components of the optical delay line. Optical losses can be as high as ten percent per round trip or even greater. Another limitation is that the stretching ratio of the pulse is limited. This is because the energy of pulses in the train generated by the pulse-stretcher becomes vanishingly smaller after the second pulse. This limits the stretching factor of the pulse-stretcher to less than 3. In a case where the pulse has to be stretched by a greater factor, two or more consecutive pulse-stretchers have to be used, which adds to energy inefficiency. Energy inefficiency converts to higher cost of the system and higher operating cost of the system. For these reasons, it would be preferable that the laser initially emitted a longer pulse, so that the pulse stretcher could be made simpler and more efficient.

High spectral purity, or low ASE level in the output of the laser, are important in order to achieve high contrast of the mask image at the wafer. This allows for reduced critical dimensions and increased process latitude. Typically, an integral ASE level of below several times $10^{-4}$ is required in systems operating at a wavelength of 193 nm.

High output power is important for high throughput of the manufacturing process. Typically, the required power is set by the transmission of the optical lithography projection apparatus and required rate of wafer throughput of the stepper. A conventional, single-oscillator, excimer laser cannot provide the required high output power with the required narrow spectral emission bandwidth. These two requirements are in conflict with each other, since for obtaining the narrow bandwidth the oscillator must run at low output power. At higher powers, sophisticated means for spectral line narrowing including prisms and gratings cannot be employed. Accordingly, preferred laser systems employ above-mentioned MOPA or MOPO laser systems. Such systems include a combination of a low-power master oscillator (MO) with superior narrow spectral emission bandwidth, and a power amplifier (PA) or a power oscillator (PO), which then amplifies a narrow bandwidth signal from the master oscillator to a high power output beam.

FIGS. 1A and 1B schematically illustrate prior-art MOPA laser systems 20 and 22 respectively. MOPA 20 includes a master oscillator 24 and a power amplifier 26. Master oscillator 24 includes a line-narrowing unit 25 including wavelength selective optical elements such as prisms, and often a grating used in cooperation with prisms. As such line-narrowing arrangements in a master oscillator are well known in the art, the arrangements are not discussed in detail herein. An output beam (pulse) 28 from oscillator 20 is directed by mirrors 30 and 32 into power amplifier 26. The beam makes a single pass through amplifier 26, is amplified therein, and is output therefrom as amplified radiation. In MOPA 22, a power amplifier 27 is arranged for double pass amplification. An output beam (pulse) 28 from oscillator 20 is directed by mirrors 30 and 32 into power amplifier 26. Beam 28 makes a first pass through amplifier 27 and is reflected from a mirror 31 back through the power amplifier. The beam is amplified on each pass through the amplifier and the amplified beam is directed out of MOPA 22 by mirror 33.

FIGS. 2A and 2B schematically illustrate prior-art MOPO laser systems 34 and 40 respectively. MOPO 34 includes a master oscillator 24 (including line-narrowing elements 25) and a power oscillator 36 having a stable resonator formed by a partially transparent input mirror 38 and a partially transmitting outcoupling mirror 39. An output pulse 28 from master oscillator 24 is directed by mirrors 30 and 32 through partially transmitting mirror 38 into the power oscillator and seeds the oscillator. This causes the power oscillator to oscillate with the characteristics of the seed pulse. MOPO 40 utilizes a Cassegrain-type unstable resonator power oscillator 37 formed between a concave mirror 41 and a convex outcoupling mirror 43. Mirror 41 has an aperture 42 therein which allows efficient incoupling of the seed beam (pulse) 28 into the power oscillator. In this type of power oscillator, mirrors 41 and 43 are usually arranged as close to the gain chamber of the oscillator (not explicitly shown) as possible. This results in a short round-trip time, for example about 10 nanoseconds (ns), which helps to achieve maximum energy extraction efficiency from the gain chamber, but the resulting output pulse length is only 20 ns. Having a shortest possible resonator is consistent with the limitations of space available within the volume and footprint of the laser enclosure, as both are very valuable in a clean room environment.

The output power of a MOPA depends directly on the power of the master oscillator. The optical design of a MOPA is simpler than that of a MOPO, at least when the power amplifier is used in single pass as depicted in FIG. 1A. However, the power extraction efficiency is limited, especially if the master oscillator emits low power. For a multiple pass amplifier, such as illustrated in FIG. 1B, the setup quickly becomes complicated, as the output and input beams have to be spatially separated. Since the output power of the amplifier depends on the input from the master oscillator, the master oscillator still has to emit comparably high power, which sets a limit to narrowing of the spectral emission bandwidth in the master oscillator.

In a MOPO arrangement, the master oscillator functions only as a low power seed source for the power oscillator, which oscillates and emits high power with the same bandwidth as the master oscillator. The power oscillator is a fully functional oscillator, which, in free lasing, emits maximum output power stored in the gain medium. The power of the seed source (master oscillator) has limited influence on the output power from the power oscillator. Since only low power is needed for seeding, the master oscillator can run at a much lower output power level. Because of this sophisticated methods for narrowing the spectral emission bandwidth can be employed. A MOPO arrangement, accordingly, is strongly preferred for high power narrow bandwidth operation.

In a MOPO system, however, degradation of internal optical components due to exposure to high energy UV radiation occurs more rapidly than in a MOPA laser. This is especially true of the outcoupling mirror of a MOPO laser, which is at normal incidence to a high-intensity output beam. Further, the power oscillator of a MOPO laser, if not seeded, oscillates independently and emits light with broad spectral characteristics. Also, if seeding is insufficient, a background of broad emission characteristics will overlay the narrow bandwidth spectrum of the seed source. Such background is highly undesirable, especially for lithography applications. Even when seeding is nearly perfect, some background of amplified spontaneous emission (ASE) still exists. Such background has to be suppressed to obtain high spectral purity.

Another disadvantage of a MOPO laser system results from cross talk between the master oscillator and the power amplifier. This cross talk can degrade the performance of the master oscillator. Seeding of the power amplifier is usually accomplished by means of a partially reflecting mirror, which is also the rear mirror of the power oscillator, as discussed above with respect to MOPO 34 of FIG. 2A. Both the seed beam and the rear mirror have to be aligned to the axis of the power oscillator. The master oscillator and power oscillator share the same optical axis, and the rear mirrors and outcoupling mirrors of both oscillators are normal to the optical axis. Cross talk results from mutual feed back between the two oscillators.

Two solutions have been applied to this cross talk problem. One solution is to provide sufficient optical length between the two oscillators that the entire length of the seed pulse is already emitted from the master oscillator before the cross talk can set in. Providing an optical delay line of sufficient length between master oscillator and power oscillator can effectively suppress cross talk. Such a delay line, however, consumes valuable space inside a laser enclosure.

Another potential solution would be to align the mirrors of the power oscillator off the optical axis of the master oscillator. This option, unfortunately, is not feasible for a linear power oscillator. There is a need to overcome the cross-talk problem and other above-discussed shortcomings of MOPO lasers.

SUMMARY OF THE INVENTION

In one aspect, the present invention is directed to a laser system comprising a master oscillator for generating a beam of laser radiation and a power oscillator for amplifying the laser radiation beam, and delivering the amplified laser pulse. The power oscillator has a resonator including least one optical arrangement for restricting the bandwidth of radiation of radiation that can be amplified therein.

A preferred bandwidth-restricting element is a prism. Two prisms may be included in the power oscillator and arranged to fold the resonator axis at 90°.

In another aspect of the present invention the resonator of the power oscillator is a ring resonator and the beam of radiation is in the form of a laser pulse. The ring resonator provides for an extended time in the resonator between amplifying events, compared with a linear resonator having the same gain medium and the same round trip distance. The extended time between amplification events provides for a longer pulse length than would be obtain in a power oscillator having a linear resonator having the same round trip distance. The extended distance between amplification events also provides for reducing ASE.

In yet another, non-exhaustive aspect of the present invention, the master oscillator includes a linear laser-resonator having a length of about 2 meters or greater. This provides for a greater time between amplification events compared with that of a shorter linear resonator having a length less than 2 meters. Advantages of the extended time between amplifying events include those discussed above with reference to the ring resonator.

The long resonator affords an option of including a grazing incidence reflective telescope therein. The grazing incidence telescope is arranged to expand a light beam circulating in the resonator such that the expanded beam is incident on an outcoupling mirror of the resonator. Expanding the beam on the outcoupling mirror reduces power density on, and consequently the possibility of optical damage to, the outcoupling mirror. Light being incident at grazing incidence in the telescope, power density on mirrors of the telescope is also reduced.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

FIG. 11 schematically illustrates a simple triangular prism configured to compress a beam normally incident on one face thereof, while allowing the compressed beam to exit an adjacent face of the prism at Brewster's angle thereto.

FIG. 12 schematically illustrates a Pellin-Broca prism configured to turn a beam incident thereon through 90° by total internal reflection, with the beam entering the prism at an entrance face thereof at Brewster's angle thereto and exiting the prism at an exit face thereof at Brewster's angle thereto, and with the beam having the same width on entering and exiting the prism.

FIG. 12A schematically illustrates the Pellin-Broca prism of FIG. 12 rotated such that the beam enters the prism at and angle less than Brewster's angle to the entrance face and exits the prism at an angle greater than Brewster's angle to the exit face with the beam being compressed as a result of traversing the prism and being turned by an angle greater than 90°.

FIGS. 19A and 19B are views, seen in mutually perpendicular axes, schematically illustrating a twelfth embodiment of a MOPO laser in accordance with the present invention similar to the laser of FIGS. 17A-B but wherein the grazing incidence, beam expanding telescope is additionally configured to fold the resonator axis of the master oscillator by 90°.

DETAILED DESCRIPTION OF THE INVENTION

As one solution to the above-discussed problem of ASE suppression and achieving high spectral purity in a MOPO laser, certain embodiments of MOPO lasers in accordance with the present invention have a power oscillator including optical elements for limiting spectral bandwidth thereof. The emission spectrum of the inventive bandwidth-limited power oscillators, in a free lasing mode, is still relatively broad, compared to a line-narrowed master oscillator, but narrow compared to the non bandwidth-limited power oscillators of prior-art MOPO lasers. The bandwidth of the main lasing line of the power oscillator, when amplifying a seed beam, is determined primarily by the line-narrowing elements of the master oscillator. The bandwidth-narrowing elements of the inventive power oscillator function primarily to restrict the bandwidth of ASE.

By way of example, if the power oscillator is bandwidth-limited to about 10% of what the bandwidth would be without bandwidth-limiting elements, then the background of ASE in the seeded bandwidth-limited power oscillator is expected to be reduced by the same factor. For 90% of the ASE bandwidth, the power oscillator acts as a low-gain amplifier, since most of the ASE light is diverted by the bandwidth-limiting elements away from the gain-providing medium of the power oscillator. In contrast, the seeded light is only slightly affected, since the bandwidth-limiting elements of power oscillator are tuned to the wavelength of the master oscillator, and, accordingly, the power oscillator always has high-gain for the seed signal (seed pulse or seed beam).

Figure 1A:
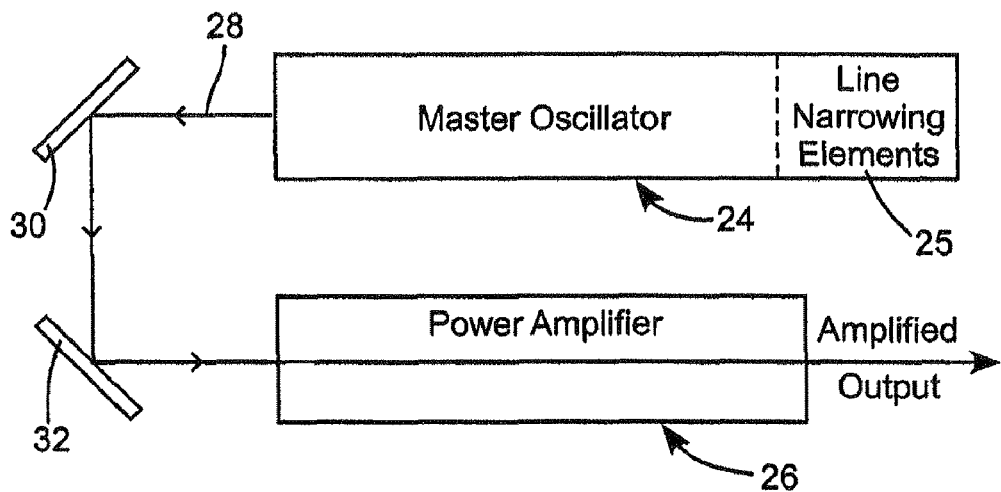
FIG. 1A schematically illustrates a prior-art MOPA laser system including a line-narrowed master oscillator, the output of which is amplified by a single-pass power amplifier.
Figure 1B:
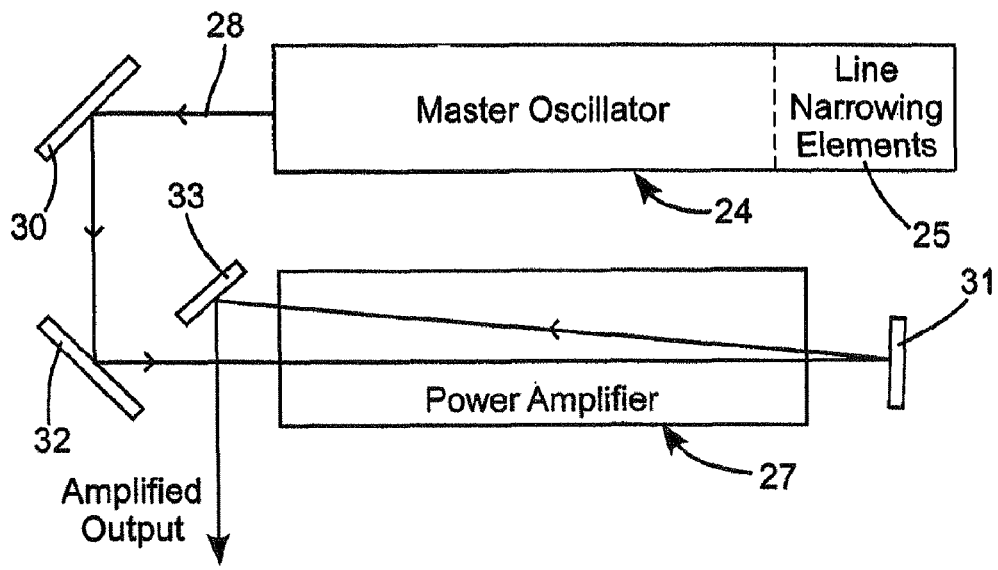
FIG. 1B schematically illustrates a prior-art MOPA laser system including a line-narrowed master oscillator, the output of which is amplified by a double-pass power amplifier.
Figure 2A:
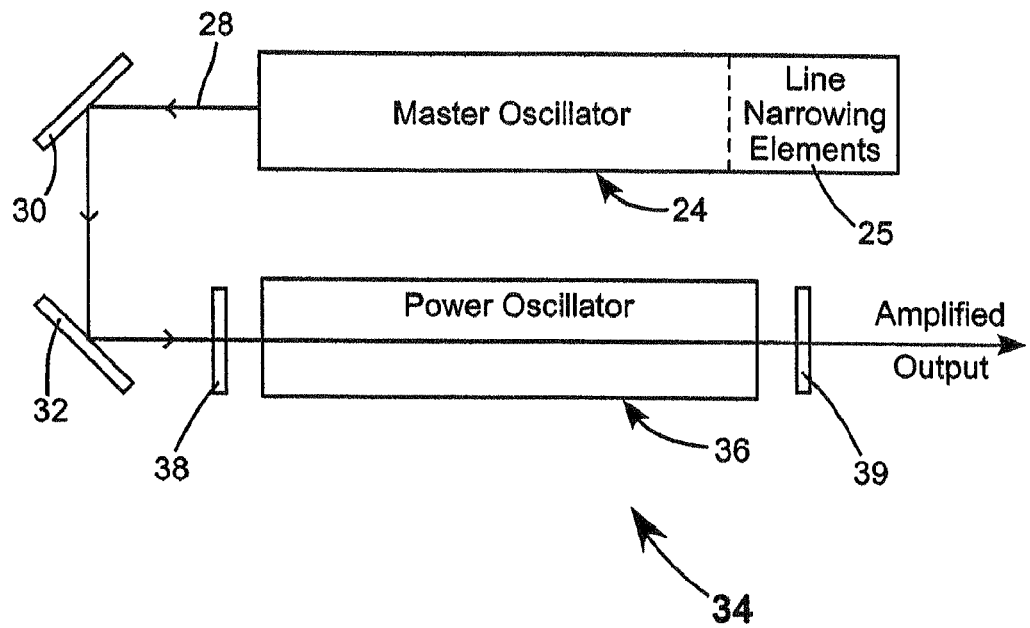
FIG. 2A schematically illustrates a prior-art MOPO laser system including a line-narrowed master oscillator, seeding a power oscillator having a stable resonator configuration.
Figure 2B:
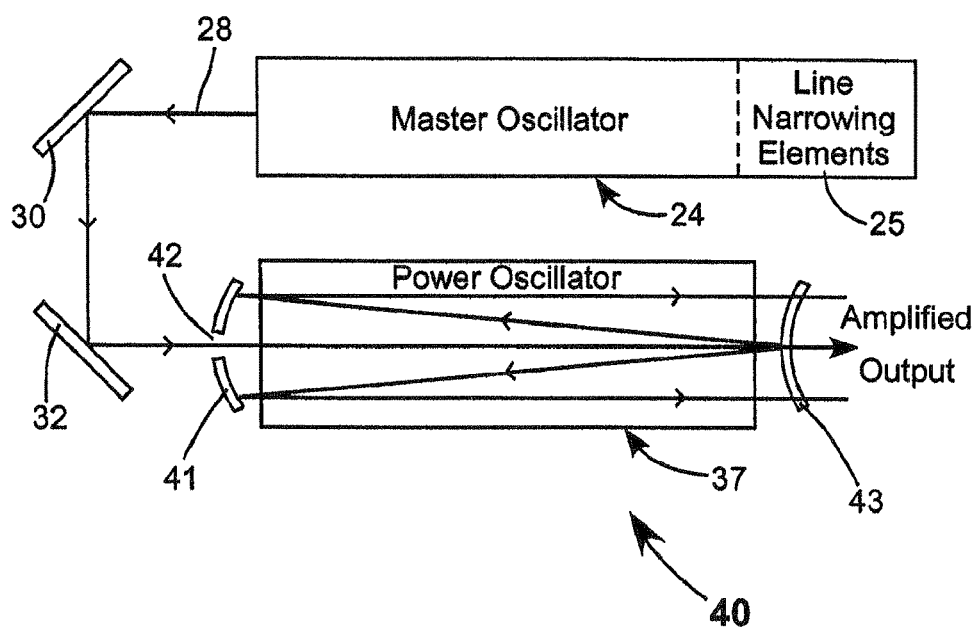
FIG. 2B schematically illustrates a prior-art MOPO laser system including a line-narrowed master oscillator, seeding a power oscillator having a Cassegrain type unstable resonator configuration.
Figure 3:
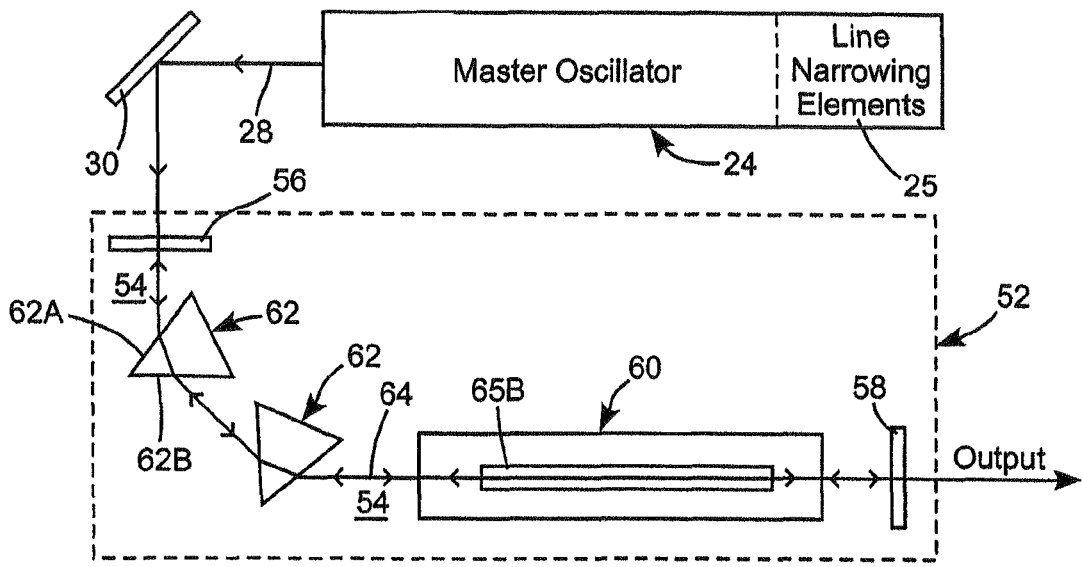
FIG. 3 schematically illustrates a first embodiment of a MOPO laser system in accordance with the present invention including a line-narrowed master oscillator, seeding a bandwidth-limited power oscillator having a stable linear resonator formed between a partially transmissive rear mirror and a partially transmissive outcoupling mirror, a gain medium in the resonator, and a pair of triangular prisms located between the gain medium and the rear mirror, with an optical arrangement being provided for injecting a seed pulse into the power oscillator via the rear mirror thereof.

Referring again to the drawings, wherein like features are designated by like reference numerals, FIG. 3 schematically illustrates a first embodiment 50 of a MOPO laser in accordance with the present invention. MOPO 50 includes a master oscillator 24 (including line-narrowing elements 25) and bandwidth-limited power oscillator (BLPO) 52. BLPO 52 has a resonator 54 formed between a partially transmissive rear mirror 56 and a partially transmissive outcoupling mirror 58. Included in resonator 54 is a gain chamber 60 including lasing gases and parallel, spaced-apart planar electrodes, across which an electrical pulse can be delivered to create a discharge in, and thereby energize, lasing gas (gain-medium) therebetween for providing optical gain. Only a lower one of the electrodes 65B is depicted in FIG. 3.

It should be noted, here, that FIG. 3 is a view seen along what is termed by practitioners of the excimer laser art as the "long beam-axis" of resonator 54. An excimer laser typically generates a beam that is wider than it is high. The long beam axis (perpendicular to the plane of the electrodes, i.e., perpendicular to the plane of the drawing) is the axis in which the beam in gain chamber 60 is widest. It should also be noted that in FIG. 3, and other drawings herein, the spatial location of the master oscillator with respect to the power oscillator is chosen primarily for convenience of illustration. In practice the master oscillator may be in some other location relative to the power oscillator without departing from the spirit and scope of the present invention.

Two isosceles triangular prisms 62 are located in resonator 54 between the gain chamber (gain-medium) and rear mirror 56. Here, the triangular prisms are configured and arranged to cause the path 64 of laser light circulating in resonator 54 to be turned a total of 90° between the gain medium and the mirror. It should be noted that in FIG. 3, and all other drawings of the invention referred to herein, the path of a light beam is generally indicated by a single line with open arrowheads indicating the direction of travel. Where a beam width is explicitly depicted, two lines are used to indicate bounds of the beam.

Continuing with reference to FIG. 3, there is no requirement in MOPO 50 that the beam path be turned exactly at 90°. Preferably, prisms 62 are configured and arranged such that light is incident on faces 62A and 62B of each prism at or close to the Brewster angle. This avoids requiring anti-reflection coatings on the prisms. Seed beam 28 from master oscillator 24 is reflected from mirror 30 and delivered to BLPO 52 through mirror 56 thereof. The seed beam is amplified by BLPO 52 and delivered as output radiation through outcoupling mirror 58.

The bandwidth limiting arrangement of prisms 62 is tuned to the same wavelength as the master oscillator. Accordingly, losses in power oscillator are minimal for the seed light. Light having wavelengths other than the wavelength of the seed light is diverted away from the resonant path 64 of the seed light. As most of the ASE has such wavelengths, most of the ASE is so diverted and resonator losses for ASE are much higher than those for the seed light, resulting in a lower gain for the ASE. This results in a corresponding reduction in ASE as a percentage of amplified seed light (output).

Further, each surface of prisms 62 acts as a partial polarizer. At each of the surfaces p-polarized light is transmitted with relatively low losses, for example less than about 1%, while s-polarized light encounters significant losses, for example, greater than about 10%. With each pass through such a surface the s-polarized portion of the beam is further attenuated. Inside the resonator, the laser beam is p-polarized almost perfectly. In contrast, ASE is mainly randomly polarized. Because the s-polarized portion of the ASE encounters high losses at the prism surfaces, ASE is further attenuated. Dispersion and polarization by the prisms, together, reject most of the ASE from the output of the power oscillator.

Losses per round trip for signal light in the BLPO are much smaller than those for the master oscillator, due to a larger acceptance bandwidth and minimum number of optical components in the BLPO. Accordingly, no active means for adjusting tuning of the BLPO wavelength is needed, resulting in high output power and low sensitivity to misalignment.

The timing of a gain-medium-energizing discharge in master oscillator 24 with respect to the timing of a gain-medium-energizing discharge in gain chamber 62 of BLPO 52 is adjusted for optimum seeding efficiency with the lowest possible seed power. Since the seed signal has to compete with the spontaneous emission within the gain medium of the BLPO, the timing is adjusted so seeding takes place just before the natural pulse evolution (free lasing oscillation) inside the BLPO can start. Because of this, most of the power of the gain medium is extracted before most of the spontaneous oscillations have a chance to develop.

If the seed pulse were to be delivered too early, the gain in gain chamber 60 of the BLPO 52 would not be sufficiently evolved, and the power of the seed signal would decay before oscillation could start. If the seed signal were to arrive too late, the signal would compete with a strongly evolving (free lasing) ASE pulse. Given these effects of timing, the ratio of power within and outside the desired bandwidth in the BLPO output will depend on the relative timing of the seed pulse discharge and BLPO discharge, in addition to the bandwidth limiting (ASE diverging) effect of prisms 62. Accordingly, this timing must be optimized in order to take maximum advantage of the ASE-reducing effect of the inventive bandwidth-limited power oscillator.

Figure 4:
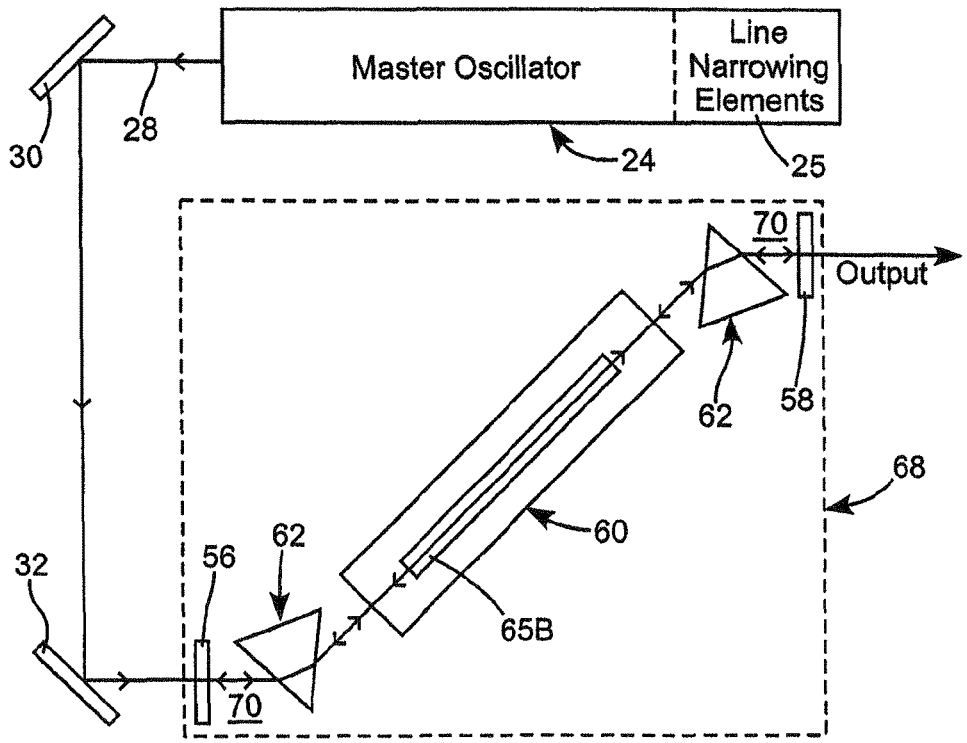
FIG. 4 schematically illustrates a second embodiment of a MOPO laser system in accordance with the present invention including a line-narrowed master oscillator, seeding a bandwidth-limited power oscillator having a stable linear resonator formed between a partially transmissive rear mirror and a partially transmissive outcoupling mirror, a gain medium in the resonator, one triangular prism located between the gain medium and the rear mirror, and another triangular prism located between the gain medium and the outcoupling mirror, with an optical arrangement being provided for injecting a seed pulse into the power oscillator via the rear mirror thereof.

FIG. 4 is a long beam-axis view schematically illustrating a second embodiment 66 of a MOPO laser in accordance with the present invention. MOPO 66 includes a master oscillator 24 (including line-narrowing elements 25) and bandwidth-limited power oscillator (BLPO) 68. BLPO 68 has a resonator 70 formed between a partially transmissive rear mirror 56 and a partially transmissive outcoupling mirror 58. Included in resonator 70 is a gain chamber 60, as discussed above. One isosceles triangular prism 62 is located in resonator 70 between the gain chamber (gain-medium) and rear mirror 56. Another triangular prism 62 is located in resonator 70 between the gain chamber (gain-medium) and outcoupling mirror 58. Preferably, again, the prisms are configured and arranged such that light is incident on isosceles faces 62A and 62B of each prism at or close to the Brewster angle to avoid requiring anti-reflection coatings on the prisms. Seed beam 28 from master oscillator 24 is reflected from mirrors 30 and 32 and delivered to BLPO 68 through mirror 56 thereof. The seed beam is amplified by BLPO 68 and delivered as output radiation through outcoupling mirror 58. Arranging one prism at each end of the gain chamber as opposed arranging both prisms at one end of the gain chamber has an advantage that the resonator is relatively insensitive to environmentally induced changes in alignment of the gain chamber.

The arrangement of MOPO 66 has an advantage that prisms 62 may serve as windows for gain chamber 60 replacing the standard Brewster windows (not shown). This would reduce the number of optical components in resonator 70, and, accordingly, reduce resonator losses.

Figure 5:
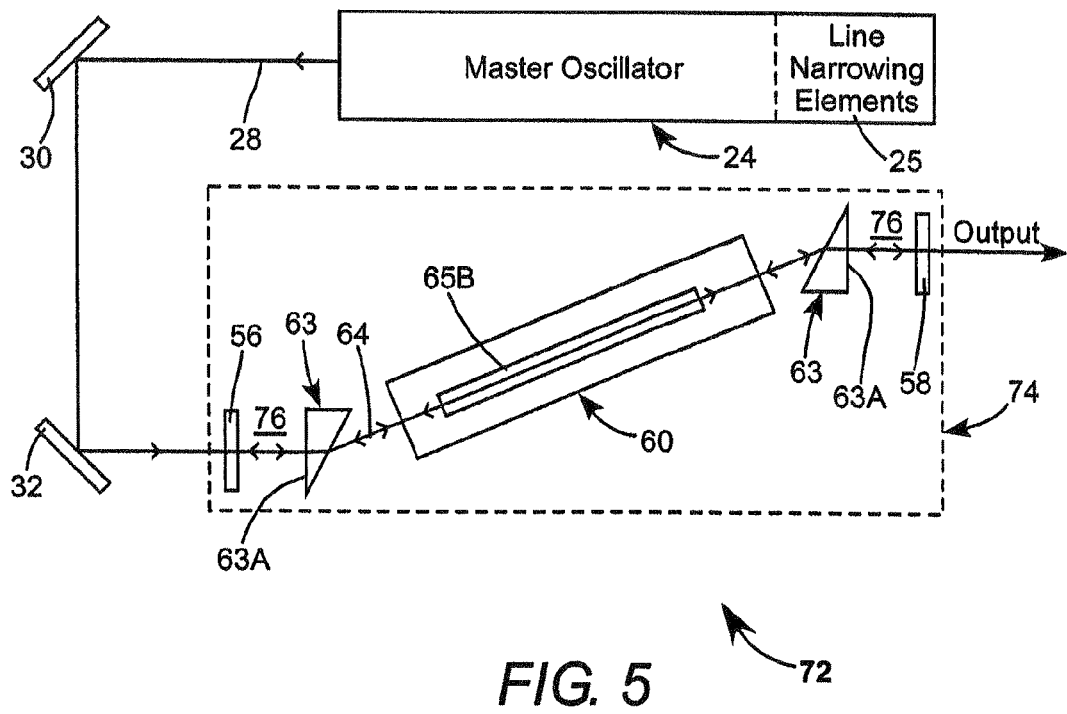
FIG. 5 schematically illustrates a third embodiment of a MOPO laser system in accordance with the present invention including a line-narrowed master oscillator, seeding a bandwidth-limited power oscillator having a stable linear resonator formed between a partially transmissive rear mirror and a partially transmissive outcoupling mirror, a gain medium in the resonator, one right-angle triangular prism located between the gain medium and the rear mirror, and another right-angle triangular prism located between the gain medium and the outcoupling mirror, with an optical arrangement being provided for injecting a seed pulse into the power oscillator via the rear mirror thereof.

FIG. 5 is a long beam-axis view schematically illustrating a third embodiment 72 of a MOPO laser in accordance with the present invention. MOPO 72 includes a master oscillator 24 (including line-narrowing elements 25) and bandwidth-limited power oscillator (BLPO) 74. BLPO 74 has a resonator 76 formed between a partially transmissive rear mirror 56 and a partially transmissive outcoupling mirror 58. Included in resonator 76 is a gain chamber 60. Resonator 76 includes two right-angled triangular prisms 63. One of the right-angled prisms 63 is located in resonator 76 between the gain chamber (gain-medium) and rear mirror 56. Another of the right-angled prisms 63 is located in resonator 76 between the gain chamber (gain-medium) and outcoupling mirror 58. Seed beam 28 from master oscillator 24 is reflected from mirrors 30 and 32 and delivered to BLPO 74 through mirror 56 thereof. The seed beam is amplified by BLPO 74 and delivered as output radiation through outcoupling mirror 58.

The arrangement of MOPO 72 also has an advantage that prisms, here right-angled prisms 63, may serve as windows for gain chamber 60 replacing the standard windows (not shown). An additional advantage of the arrangement is that the right-angled prisms can be arranged as beam expanders. This is discussed in detail further hereinbelow. This increases the area of a circulating beam on mirrors 56 and 58, thereby reducing light intensity on the mirrors and reducing the possibility of optical damage to the mirrors.

Figure 6:
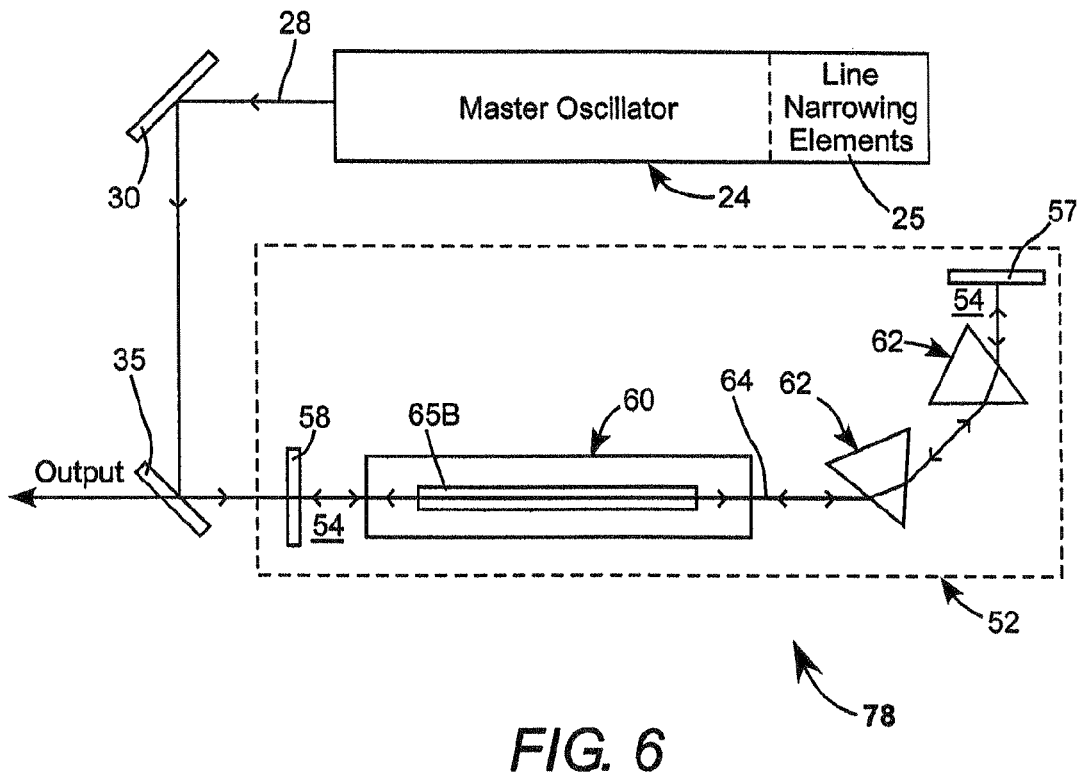
FIG. 6 schematically illustrates a fourth embodiment of a MOPO laser system in accordance with the present invention, similar to the laser of FIG. 3, but wherein the seed pulse is injected into the power oscillator via the outcoupling mirror thereof.

In all above-discussed embodiments of the inventive MOPO laser, the BLPO is seeded by directing a seed pulse from master oscillator 24 into the bandwidth-limited power oscillator through rear mirror 56 thereof. This should not be construed as limiting the inventive MOPO lasers to that method of seeding. The inventive MOPO lasers may also be seeded by directing a seed beam (pulse) 28 into the BLPO via outcoupling mirror 58 thereof. By way of example, FIG. 6 schematically illustrates a fourth embodiment 78 of a MOPO laser in accordance with the present invention. MOPO 78 is similar to MOPO 50 of FIG. 3 with exceptions as follows. Partially transmitting resonator rear mirror 56 of MOPO 50 is replaced by fully reflecting rear mirror 57. Seed beam 28 from master oscillator 24 is reflected from mirror 30 and partially reflective (between about 1% and 20% reflective) and partially transmissive beamsplitter 35 and delivered to BLPO 52 through outcoupling mirror 58 thereof.

Figure 7:
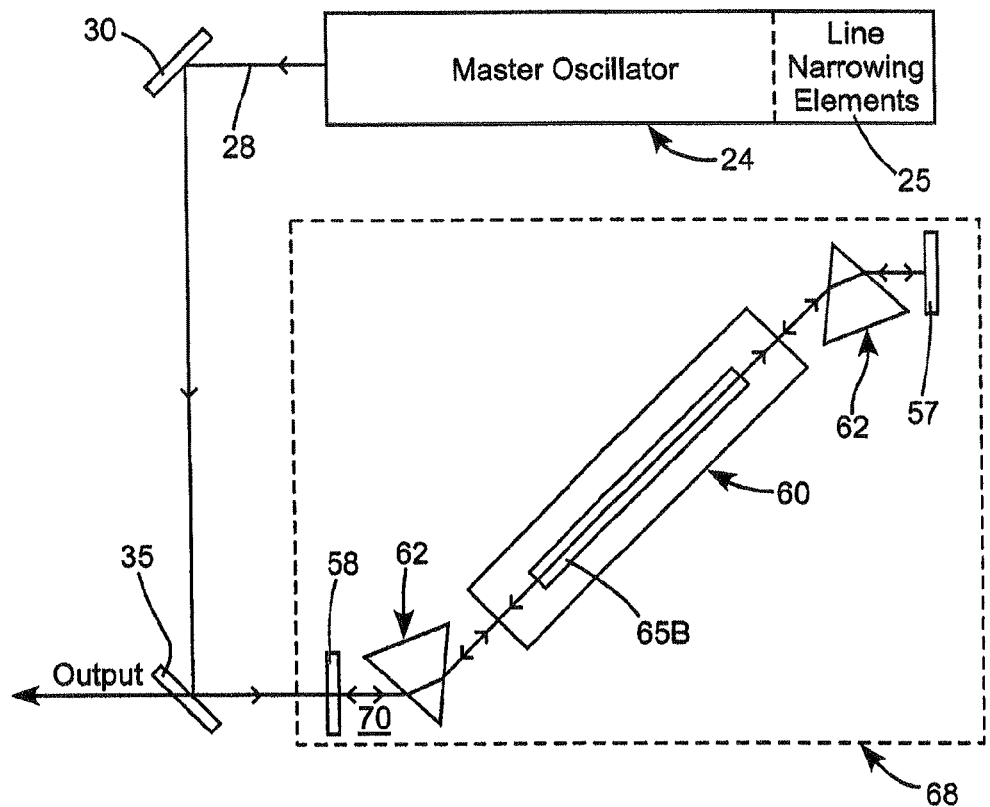
FIG. 7 schematically illustrates a fifth embodiment of a MOPO laser system in accordance with the present invention, similar to the laser of FIG. 4, but wherein the seed pulse is injected into the power oscillator via the outcoupling mirror thereof.
Figure 8:
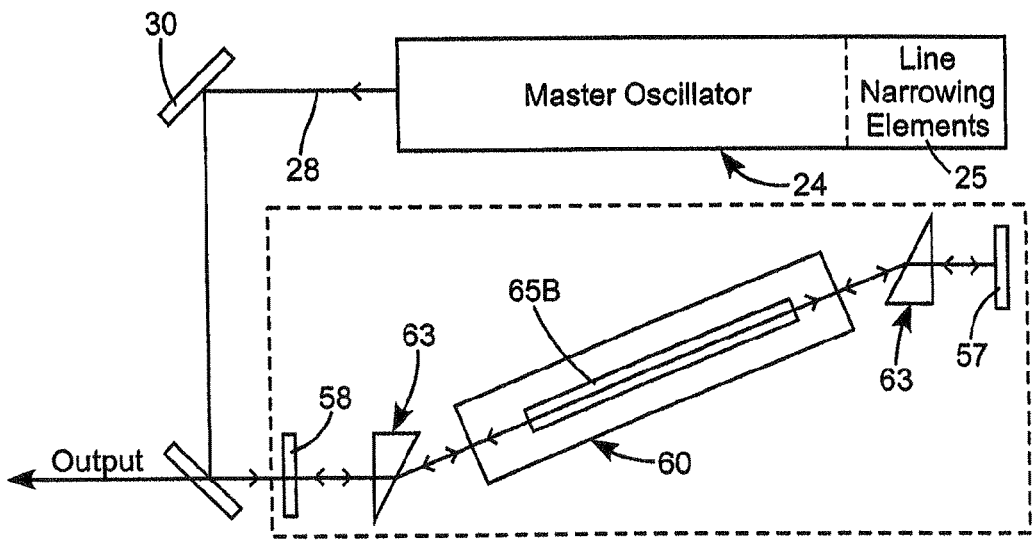
FIG. 8 schematically illustrates a sixth embodiment of a MOPO laser system in accordance with the present invention, similar to the laser of FIG. 5, but wherein the seed pulse is injected into the power oscillator via the outcoupling mirror thereof.

FIG. 7 and FIG. 8 are long beam-axis views schematically illustrating fifth (80) and sixth (82) embodiments of an MOPO laser in accordance with the present invention. MOPO 80 is similar to MOPO 72 of FIG. 5. MOPO 82 is similar to MOPO 78 of FIG. 6. In each case, a fully reflecting rear mirror 57 is substituted for partially reflecting mirror 56. In each case, also, a seed beam 28 from master oscillator 24 is reflected from a mirror 30 and a partially reflective and partially transmissive beamsplitter 35 and delivered to the bandwidth-limited power oscillator through outcoupling mirror 58 thereof.

While embodiments of the inventive MOPO laser discussed above will provide reduced ASE compared with prior-art MOPOs, these embodiments will not provide a pulse length significantly longer than a prior-art MOPO. Set forth below is a description of embodiments of MOPO lasers in accordance with the present invention that provide for longer pulse length than above described embodiments while still providing reduced ASE compared with prior-art MOPOs, and while providing other advantages over prior art MOPOs. These advantages include greatly reduced cross talk between the power oscillator and the master oscillator, and the ability to provide beam expansion in the BLPO for reducing optical damage to the BLPO components.

Figure 9:
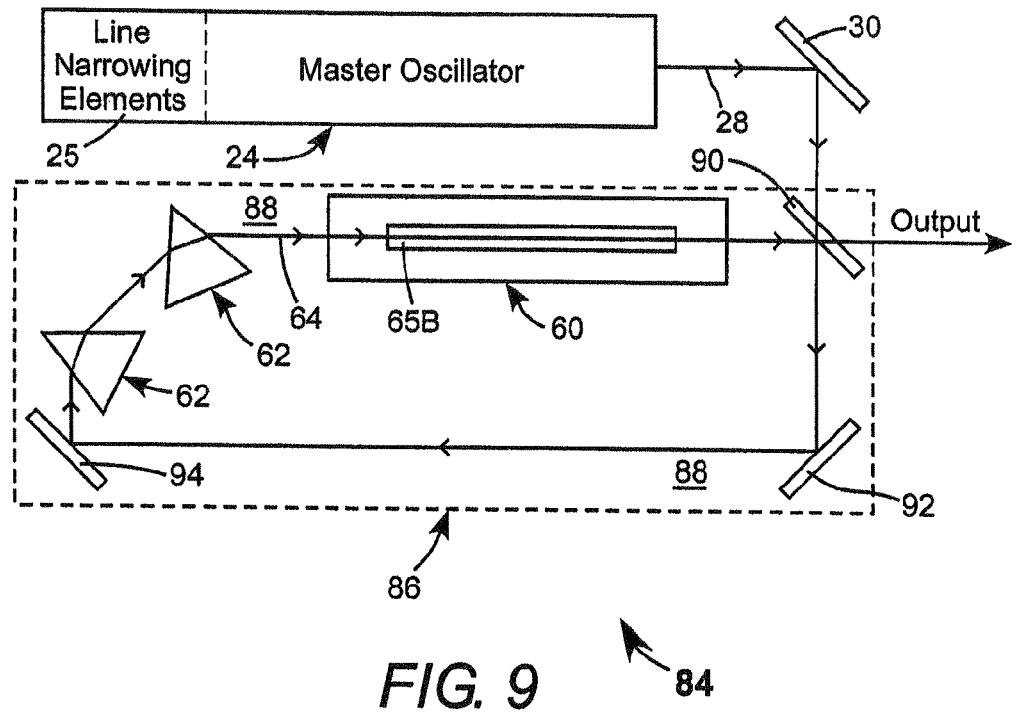
FIG. 9 schematically illustrates a seventh embodiment of a MOPO laser system in accordance with the present invention including a line-narrowed master oscillator, seeding a bandwidth-limited power oscillator having a ring resonator formed between a partially transmissive mirror and two fully transmissive mirrors, a gain medium in the resonator, and a pair of triangular prisms located between the gain medium and the partially transmissive mirror, with an optical arrangement being provided for injecting a seed pulse into the power oscillator via the partially transmissive mirror thereof.

FIG. 9 is a long beam-axis view schematically illustrating a seventh embodiment 84 of a MOPO laser in accordance with the present invention. MOPO 84 includes a master oscillator 24 (including line-narrowing elements 25) and bandwidth-limited power oscillator (BLPO) 86. BLPO 86 has a traveling-wave resonator (ring-resonator) 88 formed by a partially transmissive mirror 90, a fully reflective mirror 92 and another fully reflective mirror 94. Included in resonator 88 is a gain chamber 60, as described above. Resonator 88 includes isosceles triangular prisms 62 cooperatively arranged to turn the beam path 64 in the resonator through 90°. These prisms have the bandwidth limiting function described above with respect to other embodiments of the inventive MOPO. Seed beam 28 from master oscillator 24 is reflected from mirror 30 and delivered into resonator 88 through mirror 90 thereof. The seed beam is amplified by BLPO 86 and delivered as output radiation through mirror 90. If the transmission requirements for mirror 90 to allow seed beam injection and outcoupling should be in conflict, a partially transmissive mirror may be substituted for either of mirrors 92 and 94 and used as an outcoupling mirror, albeit at the expense of increased resonator loss.

Figure 10:
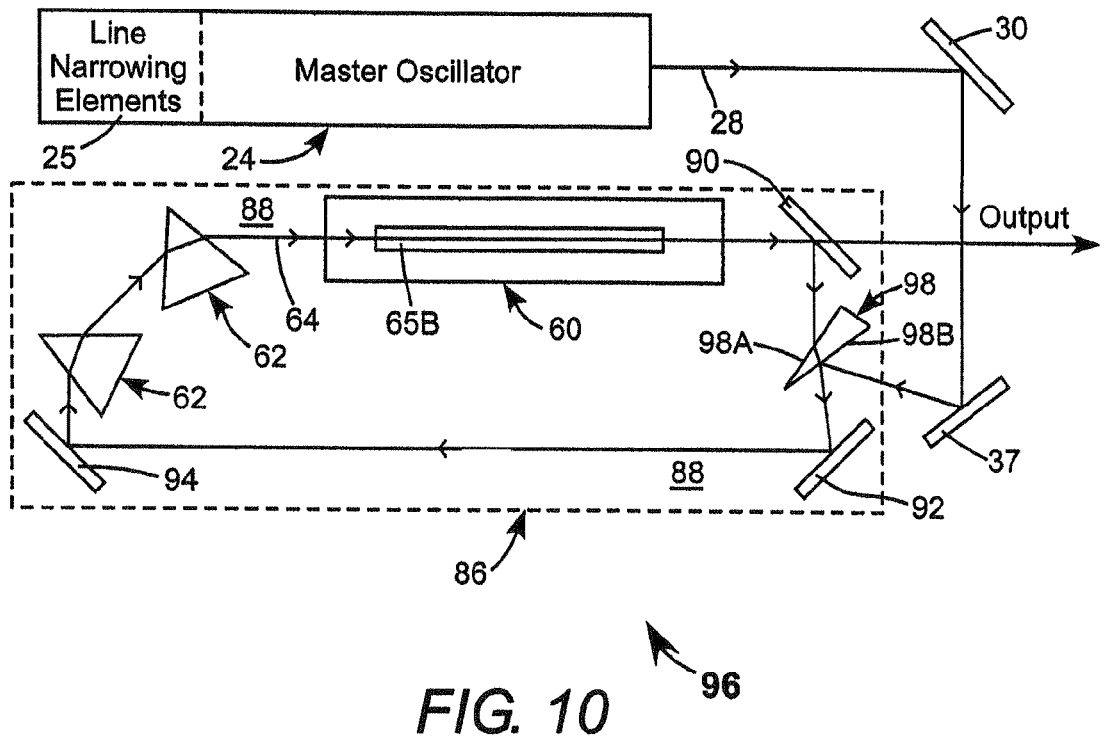
FIG. 10 schematically illustrates an eighth embodiment of a MOPO laser system in accordance with the present invention, similar to the laser of FIG. 9 but wherein a seed pulse is injected into the power oscillator via reflection from one face of an optical wedge prism located in the resonator.

FIG. 10 is a long beam-axis view schematically illustrating an eighth embodiment 96 of a MOPO laser in accordance with the present invention. MOPO 96 is similar to MOPO 84 of FIG. 9 except for the manner in which seed beam 28 is coupled into resonator 88 of BLPO 86. In MOPO 96, seed beam 28 from master oscillator 24 is reflected by mirrors 30 and 37 onto face 98B of the prism 98 nearest to mirror 91. The angle of incidence of beam 28 on face 98B is selected such that the reflected fraction of the seed beam follows beam path 64 in resonator 88.

In above-discussed, linear resonator embodiments of the inventive bandwidth-limited power oscillator, a beam passes through gain chamber 60 twice within one round trip and the resonator mirrors 56 and 58 are relatively close to the gain chamber. Because of this, there are only very short time periods in which the beam is not traversing the gain chamber. Consequently, power stored in the gain medium is extracted rapidly therefrom within a few passes through the gain chamber. This results in short pulse lengths of about 20 nanoseconds (ns), comparable to the pulse lengths in prior-art MOPO lasers.

In a ring resonator such as resonator 88, the time between successive passes of a pulse through gain chamber 60 is much longer than in the above discussed standing-wave resonators, since the beam has to be folded around the gain chamber. In contrast to any linear resonator, the beam passes only once through the gain medium per round trip. Consequently, more round trips are required to extract the power from the gain medium, and the resulting pulse length is automatically longer. One limitation, which sets an upper limit for the round trip time, is that the lifetime of the optical gain is not indefinite. If the round trip time becomes too long, the gain may already have decayed when a pulse arrives at the gain-medium following a previous round trip. If that were the case, the pulse would not be amplified further. Accordingly power extraction efficiency would decrease and pulse power would decrease. It has been determined, however, that a round trip time (resonator round trip path length) can be chosen that is a good compromise between the output pulse power and the pulse length. A pulse length in excess of 30 ns can be achieved.

The divergence of ASE is higher than that of the laser beam circulating in resonator 88. This causes the ASE beam size to expand much faster than the main laser beam. In principle, the ASE can be suppressed simply by propagating the laser beam then passing the laser beam through an aperture. The aperture filters out the ASE of high divergence. An effect of this kind takes place inside of the resonator. The longer the distance the amplified light has to travel before it encounters the gain medium again, the more the ASE is expanded. The gain medium acts as an aperture, and only a smaller portion of the ASE is amplified. In a ring resonator, this effect is much greater than in a linear resonator of corresponding round trip length. Reduction of ASE through misalignment or diversion of the ASE by the prisms is also greater in the ring resonator than in a linear resonator of corresponding round trip length.

Laser light circulating in ring resonator 88 has a natural divergence resulting from diffraction effects. A result of this is that the size of the beam expands with distance, absent any measures to prevent this expansion. Ring resonator 88 functions optimally only if, after one round trip in the resonator, the beam size is well matched to the original size of the beam. If this is not the case, the beam can encounter significant losses resulting in a decrease in efficiency. The effect of this natural divergence should preferably be compensated. One means of effecting such compensation is to compress the beam using one or more prisms. A description of the mechanism of compressing a beam with a prism is set forth below with reference to FIG. 11, and FIGS. 12A and 12B.

FIG. 11 schematically illustrates a prism 100 used as a beam compressor. A beam 102, linearly polarized in the plane of the drawing (indicated by arrow P) and having a width $W_0$, enters the prism normally to input surface 100A of the prism. At output surface 100B of the prism, the beam is refracted and the refracted beam 102R has $W_R$, which is smaller than $W_0$. Usually, such a prism would have an anti-reflective coating (not shown) on input surface 100A. If the angle between faces 100A and 100B is made equal to ninety degrees minus the Brewster angle ($90°-\theta_B$) output surface 100B does not need to be coated as beam 102R is p-polarized with respect to that surface and exits the surface at the Brewster angle, at which the reflection for p-polarized light is zero. The Brewster angle for a calcium fluoride prism at an ArF excimer laser wavelength of 193 nanometers (nm) is about 56.3° nm.

For the prism arrangement depicted in FIG. 11, beam 102R is compressed to about 60% of its original width $W_0$. The compression ratio can be changed by slightly rotating the prism. However, some of the p-polarized light will then be reflected off the exit surface and beam will be slightly attenuated. The stronger the compression and the larger the exit angle, the greater the attenuation will be. For high compression ratios higher than 60%, it is preferable to arrange two or more prisms in series with each having the preferred (Brewster's) exit angle.

Instead of the simple prism beam-expander of FIG. 11, it is preferable to use one or more Pellin-Broca prisms for beam expansion. A Pellin-Broca prism is a prism that combines the function of dispersion prism and a 90°-folding prism or turning prism in a single optical element. Such a prism can be used advantageously in a ring-resonator power oscillator in accordance with the present invention to provide a combination resonator mirror and bandwidth-limiting element.

FIG. 12 schematically illustrates a Pellin-Broca prism 104 used to turn a p-polarized beam 102 through an angle of 90° through a combination of refraction and total internal (TIR) 90° with zero Fresnel reflection losses on entering and exiting the prism. Prism 104 has an entrance face 104A (the short face), a TIR face 104B and an exit face 104C (the long face). Entrance face 104A is at 90° to exit face 104C, and TIR face 104B is inclined at $45°-\theta_B$ to exit face 104C.

Beam 102 is incident on an entrance face 104A of the prism at the Brewster angle $\theta_B$, in this example, about 56°. The beam is refracted at surface 104A at an angle of $90°-\theta_B$, i.e., the Brewster angle in the prism, to surface 104A, and is incident on and reflected from TIR face 104B at an angle of 45°. The beam is incident on exit face 104C at the refraction angle, and, accordingly, exits face 104C as refracted beam 102R at an angle $\theta_B$ (the external Brewster angle). As the beam angles on the entrance and exit surfaces are equal, width $W_R$ of refracted beam 102R is equal to width $W_R$ of the incident beam.

By rotating Pellin-Broca prism 104 such that a beam incident thereon is incident at slightly less than the Brewster angle, the prism can be used to compress beam 102. FIG. 12A illustrates this condition, where beam 102 is incident on entrance face 104A of prism 104 at the Brewster angle less some angle $\delta_1$. This increases the angle of incidence (and reflection) of the beam on TIR face 104B and consequently on exit face 104C. Beam 102R leaves exit face 104C at some angle $\delta_2$ greater than the Brewster angle, where $\delta_2$ is greater than $\delta_1$. Beam 102R will be at an angle of $90°+\delta_1+\delta_2$ to incident beam 102 and will have a width $W_R$ that is less than width $W_0$ of the incident beam. By way of example, if, for a prism having $\theta_B=56°$, the angle of incidence of beam 102 on entrance face 104A is 52°, i.e., $\delta_1$ is 4°, beam 102R will exit face 104C at an angle of 64.5 thereto, i.e., with $\delta_2$ equal to 8.5°. Beam 102R will be inclined at 102.5° to beam 102 and width $W_R$ will be about 70% of width $W_0$. For a calcium fluoride prism, the reflection loss at face 104A for light having a wavelength of 193 nm will be about 0.2% and the loss at face 104C will be about 1.0%. These losses are tolerable compared with losses that would be experienced in a conventional front surface turning mirror at the same wavelength.

It should be noted, here, that when combining two Pellin-Broca prisms in a BLPO in accordance with the present invention, the net effect of dispersion, total beam folding angle and beam expansion depend strongly on the orientation of the prisms with respect to each other and with respect to circulating beam. In an arrangement, which folds the beam through 180°, four different relative orientations of the prisms are possible.

In a first of these relative orientations, the beam may enter both prisms via the short face 104A. In a second of these relative orientations, the beam may enter both prisms via the long face 104C. In either of these first and second orientations, when the two prisms are arranged at 90° with respect to each other, the net dispersion is zero and the total beam-folding angle is always 180°, independent of the angle of the incident beam. The beam exits the pair of prisms with the same size as it entered. Such a configuration is highly desirable if slight changes in wavelength or direction of the beam must not misalign the BLPO. However, this configuration is not suitable for providing line narrowing.

In a third of the relative orientations, the beam enters the first prism via the short face, and the second prism via the long face. In a fourth of the relative orientations, the beam enters the first prism via the long face and enters the second prism via the long face. If the prisms are oriented in these third and fourth orientations, but still at 90° with respect to each other, the total folding angle becomes wavelength dependent. The net dispersion is not zero and the oscillator becomes sensitive to the wavelength and the angle of the beam.

For any of the four orientations, if the prisms are used in some "non-Brewster" alignment to a beam, for example, similar to that depicted in FIG. 12A, the desired magnification ratio (beam compression or expansion) can be chosen within certain limits. In such non-Brewster alignment, the total beam-folding angle differs from 180°, and the net dispersion is never zero. Magnification, total folding angle, and dispersion are interdependent, so not all combinations are possible. Combinations can be found, however, by using simple trigonometry, which give a desired magnification for a chosen folding angle.

Pellin-Broca prisms may have one disadvantage inasmuch as the optical path length within a prism is quite long. If the prism material is sufficiently absorbing for light traversing the prism, or if the prism material degrades, then losses and thermal distortions can be expected. However, a beam inside the prism is always larger than the input or output beam. Because of this, especially when using the prisms in a comparably low power beam, and if the beam is expanded sufficiently, this disadvantage is outweighed by the advantages of the prism.

Figure 13:
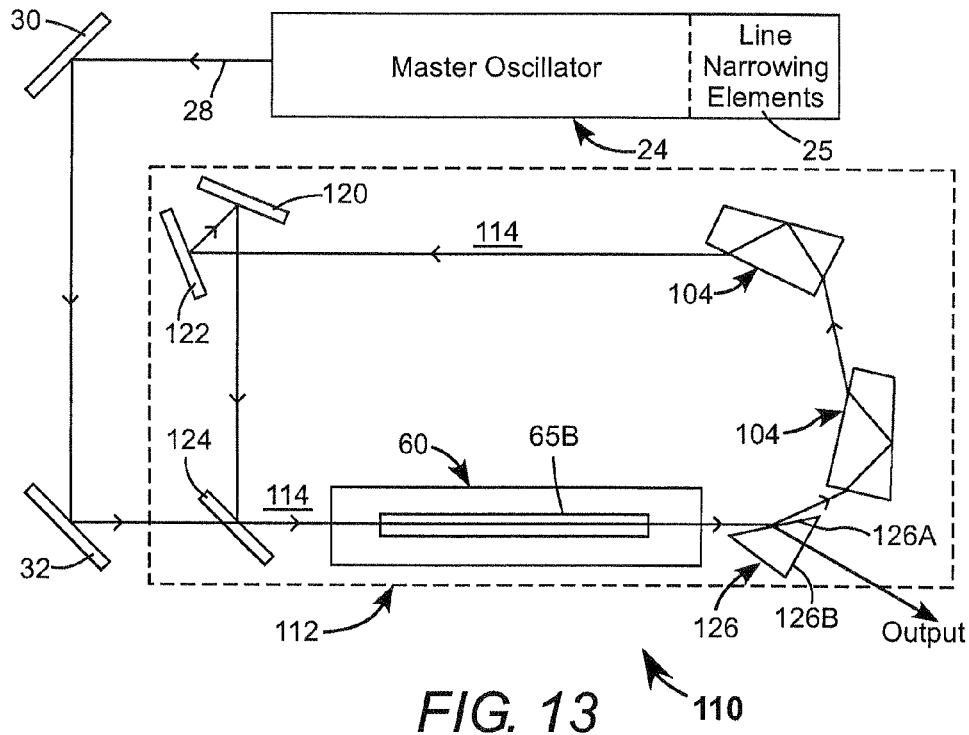
FIG. 13 schematically illustrates a ninth embodiment of a MOPO laser system in accordance with the present invention including a line-narrowed master oscillator, seeding a bandwidth-limited power oscillator having a ring resonator formed by one partially transmissive mirror, two fully reflective mirrors, two Pellin-Broca prisms in non-Brewster alignment, and a triangular prism having one face thereof serving as a grazing incidence outcoupling mirror, with an optical arrangement being provided for injecting a seed pulse into the power oscillator via the partially transmissive mirror thereof.

FIG. 13 is a long beam-axis view schematically illustrating a ninth preferred embodiment 110 of a MOPO in accordance with the present invention including a master oscillator 24 having line-narrowing elements 25, and a BLPO 112 including a ring resonator 114. Ring resonator 114 includes a gain chamber 60 and two Pellin-Broca prisms 104. Pellin-Broca prisms 104 serve as fold mirrors for resonator 114. Each of the Pellin-Broca prisms is arranged as a beam compressor, as discussed above with reference to FIG. 12A, for compensating for natural divergence of a laser beam circulating in the resonator. In the relative (orientation) orientation shown, with each of the prisms (prism faces) in a non-Brewster alignment with the circulating beam the prisms also provide some limited dispersion as discussed above. Ring resonator 114 is completed by two fully reflective fold mirrors 120 and 122, a partially transmissive fold mirror 124, and a prism 126 having a face 126A thereof arranged such that light circulating in the resonator is incident at grazing incidence thereon. By grazing incidence is meant an angle of incidence greater than about 60° and preferably greater than about 70°. A seed beam 28 from master oscillator 24 is reflected from mirrors 30 and 32 and delivered to the bandwidth-limited power oscillator through mirror 124 of resonator 114.

Face 126A of prism 126 serves as an outcoupling mirror of the resonator 114. As the outcoupling mirror in any ring oscillator sees the highest circulating power, it is important to provide that this component is resistant to degradation by optical damage. In ring-resonator 88 of FIGS. 9 and 10, a conventional plane mirror 90 is used as an outcoupling mirror. The mirror is at an angle of incidence of 45° to incident light, as are other folding mirrors of the resonator. Compared to a normal incidence mirror in a straight, standing-wave resonator, the power density on a 45° incidence mirror is reduced by a factor of about 1.7. Further reduction of the power density requires a larger angle of incidence.

At incidence angles greater than the Brewster angle, the reflectivity of an uncoated surface for p-polarized light rapidly increases with increasing incidence angle. At an angle of 70° reflection from an uncoated $CaF_2$ prism is for p-polarized light is about 5% and at an angle of 80° is about 23%. In a very high gain oscillator a reflectivity in this range is adequate for an outcoupling mirror. Using the prism arrangement of prism 126 provides an outcoupling mirror that has a higher angle of incidence and correspondingly greater tolerance to high power than a 45° incidence mirror, and does not require an optical coating. If surface 126A or prism 126 is arranged cooperative with other elements of resonator 114 such that light is incident at an angle of incidence of 80° on the surface, the beam at the surface is expanded by a factor of 5.75, and the reflectivity is about 23%. Inside prism 126 the beam is expanded by a factor of 4.3. The prism therefore acts simultaneously as a beam expander and beam splitter. By rotating the prism, the split ratio can be conveniently adjusted. The output beam leaves the prism highly expanded, thereby reducing power density on any optical elements required to interact with the output beam. This allows, for an anti-reflecting coating (not shown) to be used on output surface 126B of prism 126.

Figure 14:
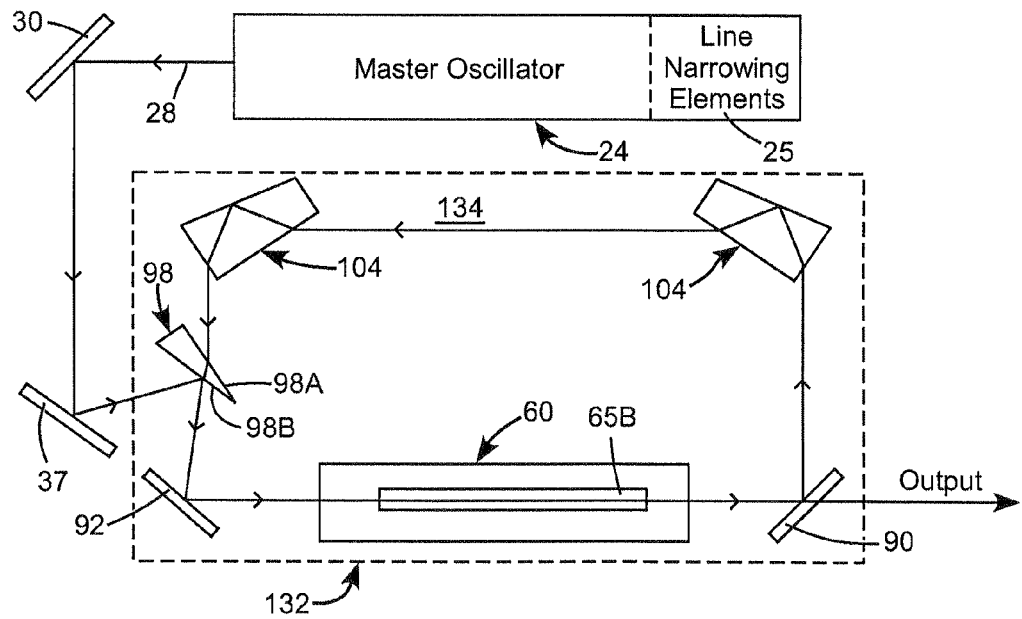
FIG. 14 schematically illustrates a tenth embodiment of a MOPO laser system in accordance with the present invention including a line-narrowed master oscillator, seeding a bandwidth-limited power oscillator having a ring resonator formed by one partially transmissive outcoupling mirror, one fully reflective mirror, and two Pellin-Broca prisms in Brewster angle alignment, with an optical arrangement being provided for injecting a seed pulse into the power oscillator via reflection from one face an optical wedge prism located in the resonator.

FIG. 14 is a long beam-axis view schematically illustrating a tenth preferred embodiment 130 of a MOPO in accordance with the present invention, having a master oscillator 24 including line-narrowing elements 25, and a BLPO 132 including a ring resonator 134. Ring resonator 134 includes a gain chamber 60 and two Pellin-Broca prisms 104. Pellin-Broca prisms 104 serve as fold mirrors for resonator 134. In this relative orientation the beams provide a relatively high dispersion. In resonator 134 each of the Pellin-Broca prisms is arranged to turn light though 90° as discussed above with reference to FIG. 12. A beam entering and leaving the prisms has the same width and is incident on refractive surfaces of the prism at the Brewster angle. Accordingly, there is no beam compression. Ring resonator 114 is completed by a fully reflective fold mirror 92, and a partially transmissive fold mirror 90 that serves as an outcoupling mirror. A seed beam 28 from master oscillator 24 is injected into resonator 134 via reflection from mirrors 30 and 37 and reflection from surface 98B of a prism 98 located in the resonator. Surface 98A of prism 98 is arranged such that light circulating in the resonator is incident at the Brewster angle thereon.

In resonator 134 of MOPO 130, and in resonator 114 of MOPO 110, light circulating in the resonators makes an even number of fold reflections per round trip in the resonator. There are six fold reflections for resonator 114 and four-fold reflection for resonator 134. In a ring resonator for a MOPO in accordance with the present invention, an even number of reflections per round trip is preferred as this provides that the resonator stays in alignment for slight variations in input angle of seed beam 28. It is this preference for an even number of reflections in resonator 114 that occasions the use of two fold mirrors 120 and 122 instead of a single mirror for making a 90° fold in the beam path.

The above-discussed problem of cross talk between an amplifier and an oscillator is virtually eliminated by employing a ring resonator as power oscillator. In every ring resonator, mirrors forming the ring resonator are aligned at non-normal incidence angle to the optical axis of the resonator. Accordingly, no element in the resonator is aligned at normal incidence to the optical axis of the master oscillator and is in a position to direct radiation back into the master oscillator. Further, a ring oscillator works as a unidirectional amplifier. By way of example, in ring resonator 134 of FIG. 14, light circulates counter-clockwise through the ring. In order to reach master oscillator 24, the light would have to travel clockwise. This only occurs for ASE, which is of much lower intensity than the laser beam.

An above-discussed advantage of the ring resonator power oscillator is an ability to generate a longer pulse than prior-art power oscillators employing a short standing-wave resonator. It is also possible to generate a longer pulse using a long standing wave resonator, however, in order to do this while generating a high power sufficient for a practical deep ultraviolet (DUV) lithography system, some measures must be devised to avoid optical damage to resonator components, in particular the output mirror as discussed above. By way of example, optical components are easily damaged at the laser fluence levels exceeding roughly 100 millijoules per square centimeter ($mJ/cm^2$).

While above described embodiments of inventive ring-resonator power oscillators are capable of generating a longer pulse than prior-art standing-wave power oscillators, it has been determined that a longer pulse can be generated by an oscillator having a standing-wave resonator that is significantly longer that that of a prior-art power oscillator. By way of example, a prior-art linear resonator for an excimer laser has a length of 1.5 meter or less, in order to reduce the time necessary for pulse evolution. In a power oscillator in accordance with the present invention a resonator length of about 2 meters or greater is preferred. A description of principal advantages of such a long resonator is set forth below with reference to FIG. 15.

Figure 15:
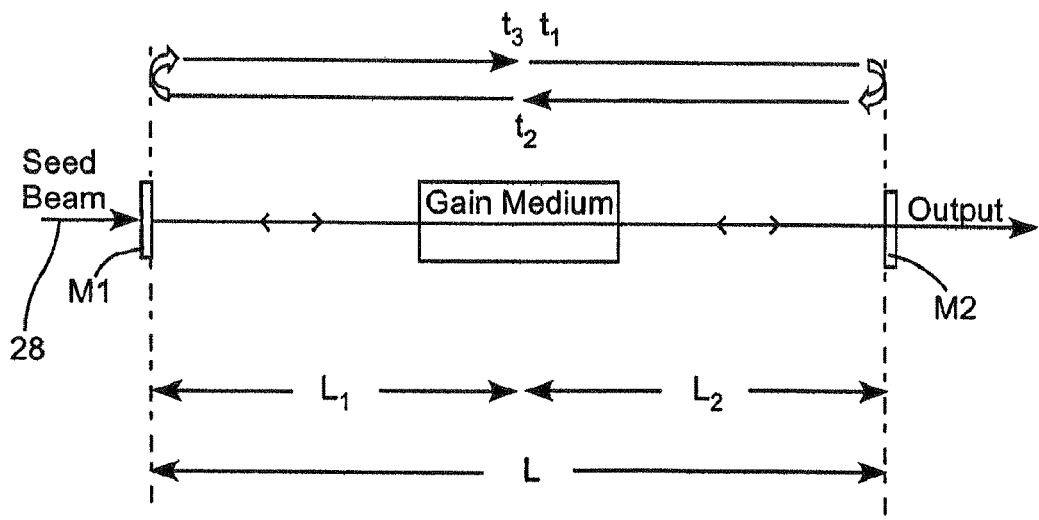
FIG. 15 schematically illustrates principles of long pulse generation in a long, stable, standing-wave linear resonator for a power oscillator in accordance with the present invention.

FIG. 15 schematically illustrates an extended linear resonator having a length L, formed between a rear mirror $M_1$ and outcoupling mirror $M_2$. A gain medium is located at a distance $L_1$ from rear mirror $M_1$, and at a distance $L_2$ from outcoupling mirror $M_2$. Seed beam 28 (seed pulse) is injected into the resonator via mirror $M_1$. The first pass of the pulse through the gain medium occurs at the time instance $t_1$, while the second and third passes occur at time instances $t_2$ and $t_3$ respectively. Since a portion of the light is output through outcoupling mirror $M_2$ on each round-trip, what is seen at the output are at least two pulses delayed with respect to each other by a time interval $(t_3-t_1)$. This time interval is equal to L/c, where c is the speed of light, and represents the total round-trip time of light in the resonator. Accordingly, the longer the resonator the longer the output pulse that can be achieved. It is important, however, that the time interval between the first two passes $(t_2-t_1)$ does not exceed the duration of a gain pulse (pulsed electrical discharge) in the gain medium. The time interval $(t_2-t_1)$ depends on the length $L_2$, and not the total length L. Because of this, time interval $(t_2-t_1)$ can be reduced by placing the gain medium closer to outcoupling mirror $M_2$ than to rear mirror $M_1$. Because of this, total resonator length L can be increased in order to achieve a longer output pulse, without a penalty of lower gain per round-trip.

An additional advantage of an increased resonator length L is the reduced level of ASE emitted from outcoupling mirror $M_2$ together with laser (amplified pulse) output. A reason for this, as discussed above with respect to embodiments of inventive ring power oscillators, is that ASE has a large divergence angle compared with laser radiation. Because of this, as ASE propagates from the gain medium towards rear mirror $M_1$ and then back towards the gain medium, the proportion of ASE to laser radiation is effectively attenuated due to the difference in divergence.

Figure 16:
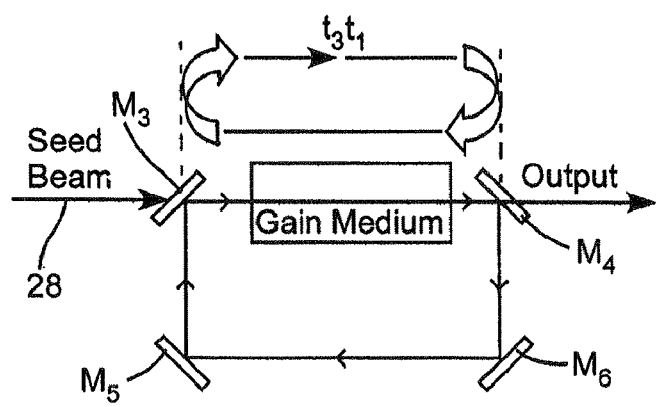
FIG. 16 schematically illustrates principles of long pulse generation in a ring resonator for a power oscillator in accordance with the present invention.

For comparison of the long, linear resonator with the above-described ring resonators, FIG. 16 schematically represents a generic ring resonator formed by mirrors, $M_3$, $M_4$, $M_5$, and $M_6$. Here, the total round-trip time cannot be increased without the penalty of increasing time interval $(t_3-t_1)$ between the passes in the gain medium. In the long linear resonator of FIG. 15, a practical limit of increasing total length of resonator L and reducing $L_2$ in the is set by considerations as follows. If rear mirror $M_1$ is placed too close to the master oscillator (not shown in FIG. 15) feedback to the oscillator will be increased. The closer the gain module is placed to mirror $M_2$, the more ASE is generated in a direction towards the master oscillator, i.e., towards mirror $M_1$. Space for the long resonator in a MOPO may be limited.

Figure 17A:
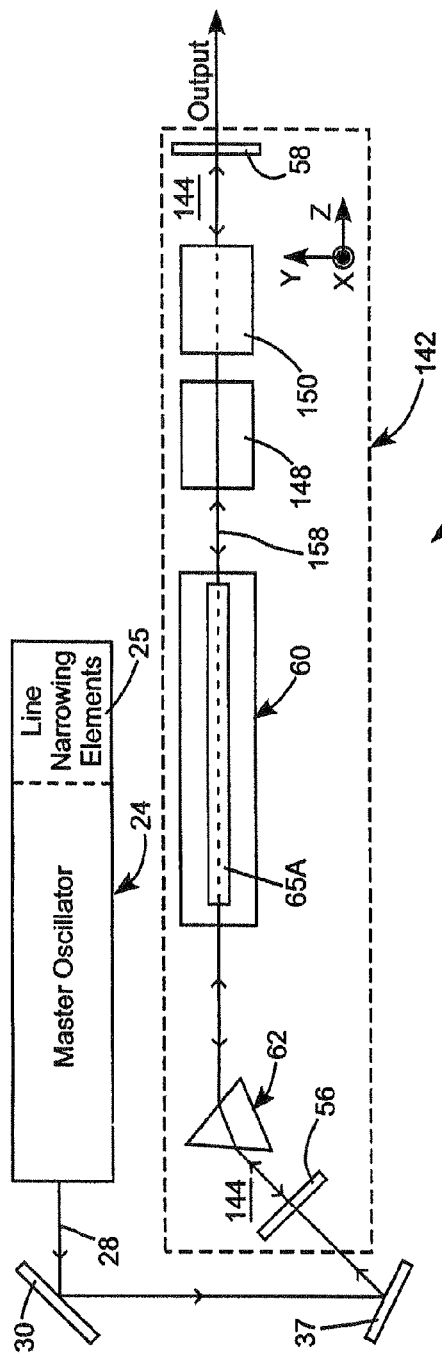
FIGS. 17A and 17B are views seen in mutually perpendicular axes schematically illustrating an eleventh embodiment of a MOPO laser in accordance with the present invention including a power oscillator having a stable, long, linear resonator in accordance with the principles of FIG. 15, the resonator including a grazing incidence telescope for providing an expanded output beam and including an optional spectral bandwidth limiting element, and wherein a seed beam is injected into the resonator via a rear mirror thereof.
Figure 17B:
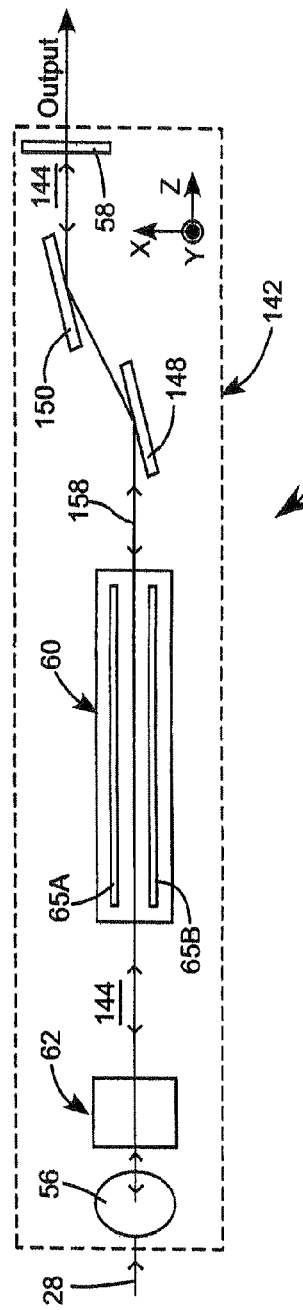

FIGS. 17A and 17B schematically illustrate an eleventh embodiment 140 of a MOPO in accordance with the present invention including a master oscillator 24 including line-narrowing elements 25 (not shown in FIG. 17B) and a bandwidth-limited power oscillator 142 including a long standing-wave resonator 144. Resonator 144 includes again a chamber 60. Gain chamber 60 includes spaced-apart parallel electrodes 65A and 65B for exciting a discharge in lasing gas in the gain chamber. FIG. 17A is a view seen along an axis generally referred to as the "long beam axis" of BLPO 142, perpendicular to the plane of the electrodes, being the axis in which an amplified beam in gain medium is widest. FIG. 17B is a view seen along the "short beam axis" of the BLPO, perpendicular to the long beam axis. The long and short beam axes are depicted in FIGS. 17A and 17B as being the X-axis and the Y-axis, respectively, with the Z-axis being the longitudinal axis of the BLPO. The Z-axis is folded by various resonator components.

Resonator 144 is a long, stable, linear resonator formed between a rear mirror 56 and an outcoupling mirror 58. Seed beam 28 from master oscillator 24 is reflected by mirrors 30 and 32 into resonator 144 via mirror 56. Rear mirror 56 is a partially transmitting mirror, for example, having a transmission between about 5% and 20%. This allows coupling of a portion of the beam 28 into resonator 44 while reflecting most of the light generated in the resonator. An optimal value of transmission for mirror 56 is determined by a trade-off between coupling in more light from the master oscillator, and transmitting less light (back out of the mirror) from BLPO 142. An (optional) isosceles triangular prism 62 is included in resonator 144 for providing additional ASE suppression over that which is characteristic of the inventive long (2 meters or greater) resonator. This prism is not necessary for obtaining beam expansion advantages of the resonator and may be omitted if the additional ASE suppression is not needed. It should be noted that without prism 62 or any similar bandwidth-limiting element, power oscillator 142 could not be characterized as a bandwidth-limited power oscillator.

Figure 18A:
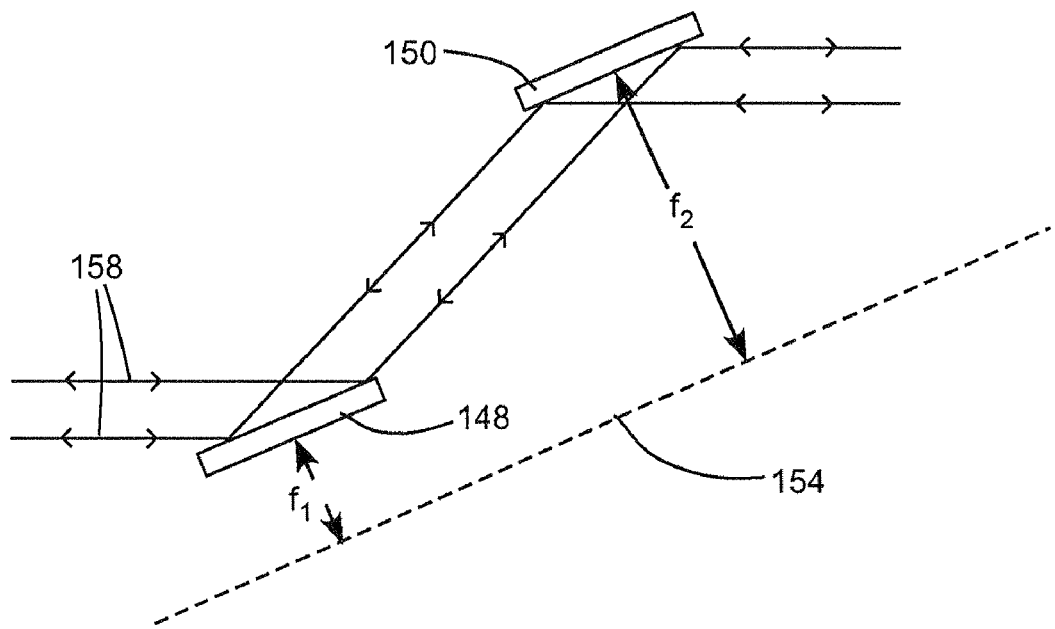
FIGS. 18A and 18B are views seen in mutually perpendicular axes schematically illustrating details of beam expansion by the grazing incidence telescope of FIGS. 17A-B.
Figure 18B:
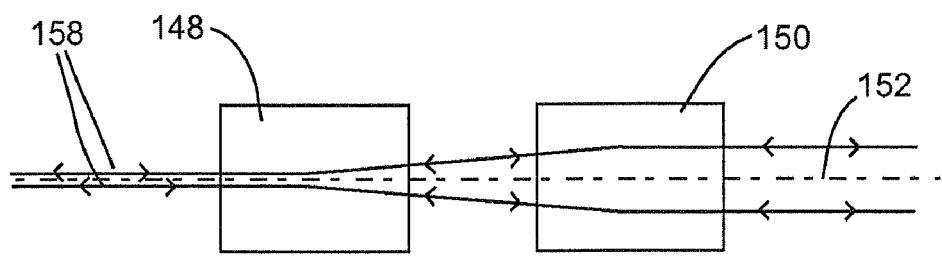

Resonator 144 includes a convex cylindrical mirror 148 and a concave cylindrical mirror 150, details of the arrangement of the mirrors are depicted in FIGS. 18A (long beam axis view) and 18B (short beam axis view). Mirror 148 has a focal length $f_1$. The cylinder axis of mirrors 148 and 150 (dotted line 152 in FIG. 18B) is in a plane containing the resonator axis. Mirror 148 expands a collimated beam 158, from gain chamber 60, in the short axis (see FIG. 18B), while the beam size in the long axis remains unchanged (see FIG. 18A). Mirror 150 has a focal length $f_2$ greater than focal length $f_1$ of mirror 148. The cylinder axis of mirror 150 is parallel to that of the mirror 148. The mirrors are arranged parallel to each other and parallel to a common focal plane 154. Because of this, mirror 150 re-collimates beam 158 in the short axis. Mirrors 148 and 150 constitute what can be described as a grazing-incidence (cylindrical) telescope.

Both mirrors 148 and 150 are arranged at a grazing incidence, i.e., at an incidence angle greater than 60°, to the incoming beam, for example, at an angle of 75°. This arrangement reduces the power density at the surface of mirror 148 by a substantial factor, for example, by factor of four at 75° incidence. This substantially avoids damage, and reduces the degradation rate of the mirror. After passing through the grazing incidence telescope, the beam is sufficiently expanded in the short axis to avoid damage to outcoupling mirror 58 and to any optical elements downstream of BLPO 142. Essentially, the expansion ratio of the beam in the short axis is equal to the ratio of the magnitudes of the focal lengths of mirrors 148 and 152. In one example of BLPO 142, an exemplary expansion ration of 4:1 for beam 158 in an arrangement with 50 W output at 4 kilohertz (kHz), provides an expanded (output) beam size of 12 mm by 6 mm. This reduces laser fluence at outcoupling mirror 58 to 17 mJ/cm$^2$, which is within a safe range as far as optical damage is concerned.

An alternative grazing-incidence mirror arrangement for mirrors 148 and 150 would be to make both mirrors concave, and increase the distance between the mirrors to maintain a confocal arrangement. In such an arrangement, beam 158 would come to an intermediate focus between the mirrors in the short axis. Those skilled in the art may devise other grazing incidence telescope or beam expander arrangements without departing from the spirit and scope of the present invention.

One advantage of using the inventive grazing-incidence telescope beam expander over a prism beam expander is that, in the prism beam expander, the incidence angle of light on the prism surface is preferably at or close to the Brewster angle, in order to reduce reflection losses. This incidence angle provides an expansion ratio at the prism surface of about 1.7:1, which is insufficient to optimally reduce degradation and damage. Another advantage of the inventive grazing incidence telescope arrangement is that grazing incidence mirrors of the telescope are designed for s-polarization of the incident light. This provides that optical losses in the mirrors and optical damage to the mirrors are optimized.

FIGS. 19A and 19B schematically illustrate a twelfth embodiment 160 of a MOPO in accordance with the present invention having a long-resonator BLPO oscillator 162 including a grazing incidence telescope beam expander. FIGS. 19A and 19B are respectively long beam axis and short beam axis views. MOPO 160 is similar to MOPO 140 but differs in the arrangement of the grazing incidence telescope beam expander. In BLPO 162, the beam expander comprises above-described grazing incidence cylindrical mirrors 148 and 150 arranged with a plane mirror 166 (also at grazing incidence) therebetween. Here, mirrors 148, 150, and 166 fold the resonator axis by 90° in order to provide the desired resonator axial (optical) length while shortening the physical "footprint" of the resonator.

Folding the inventive long resonator is not limited to folding with elements of the grazing incidence telescope. It is also possible fold a long resonator power oscillator using prisms. By way of example, two triangular prisms 62 may be included in the resonator and arranged to fold the resonator by 90° as in resonator 52 of FIG. 3. A long resonator may also be folded by 90° using one Pellin-Broca prism or by 180° using two Pellin-Broca prisms. These and other folding arrangements may be used without departing from the spirit and scope of the present invention.

In the description of the MOPO lasers of FIGS. 17A-B and FIGS. 19A-B, it is assumed, for convenience of description, that a beam leaving gain chamber 60 is collimated and is expanded and re-collimated by a grazing-incidence telescope. In practice, as discussed above, the beam has a natural divergence, which means that the size of the beam expands with distance traveled, and it is preferable to compensate for the divergence. Within one round trip of the beam in a standing wave resonator, the beam has to be compressed to its original size. In above-discussed power oscillators having ring resonators, prism elements are used for compensating beam divergence. Prisms cannot be used in a linear resonator for compensating the divergence, since for one complete round trip a prism does not have any optical power.

In the resonators of FIGS. 17A-B and FIGS. 19A-B, the grazing-incidence cylindrical mirrors 148 and 150 can conveniently be used for compensating the beam divergence in the short beam axis. This can be achieved by slightly changing the spacing of the grazing-incidence cylindrical mirrors so that they are no longer confocally arranged. A spacing between the two telescope mirrors can be found where the optical power of the grazing incidence telescope matches the natural divergence of the beam and minimizes the effective divergence of the beam inside the resonator.

As noted above, in the resonators of FIGS. 17A-B and 19A-B, an optional prism 62 is provided for providing additional ASE suppression by bandwidth limiting, i.e., spectrally diverting ASE wavelengths from the resonator axis. It is almost always preferable to suppress as much background as possible due to ASE. Each of the resonators acts, to a certain degree, as a spatial filter. The longer the resonator, the more the ASE beam is expanded before it re-enters the gain medium, and the less is the ASE that enters gain chamber 60 and is amplified. Because of this, a long linear resonator reduces the ASE level more effectively than a short linear resonator.

In the resonators of FIGS. 17A-B and 19A-B, this applies to ASE that is emitted originally towards rear mirror 56, and then passes gain chamber 60 before being output through outcoupling mirror 58. However, ASE emitted in the opposite direction may not be attenuated to the same degree, due to a shorter distance between the gain chamber and the rear mirror. Accordingly, this consideration sets the above-discussed practical upper limit to the ratio $L_1/L_2$ (see FIG. 15) at a given total length L. In the resonators of FIGS. 17A-B, one isosceles triangular prism 62 is provided for further reduction of ASE. It should be noted, however, that other wavelength-dispersive devices may be included in the resonators, including more than one prism, or one or more diffraction gratings, or optical etalons, without departing from the spirit and scope of the present invention.

Figure 20:
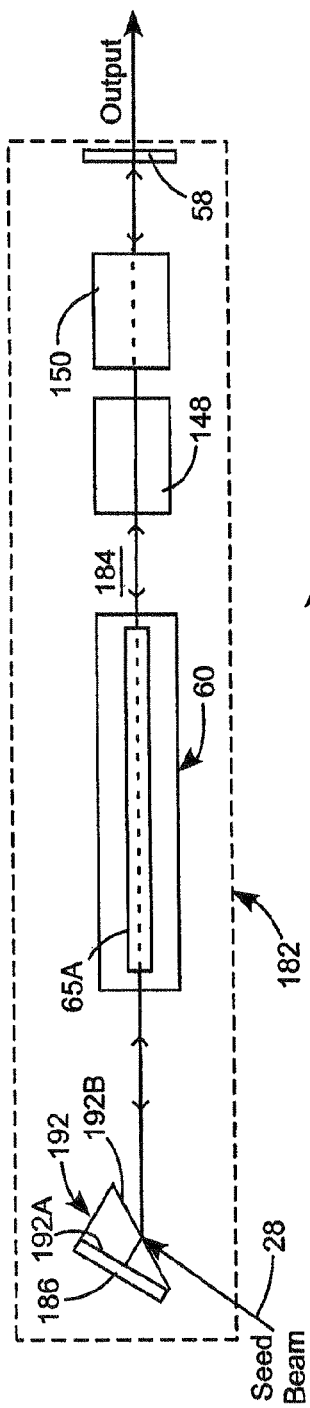
FIG. 20 schematically illustrates a thirteenth embodiment of a MOPO laser in accordance with the present invention similar to the laser of FIGS. 17A-B but wherein the seed beam is injected into the resonator via grazing incidence reflection from one surface of a prism having a thin-film mirror on another surface thereof.
Figure 21:
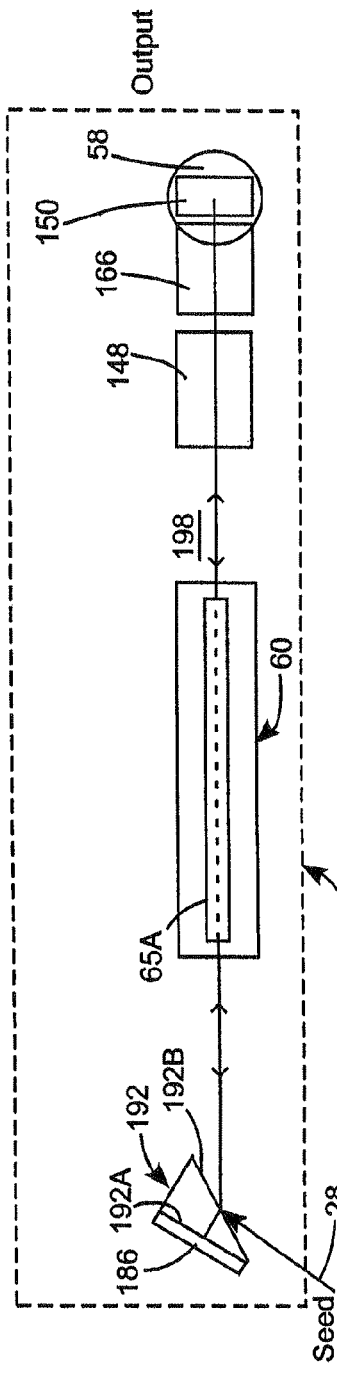
FIG. 21 schematically illustrates a fourteenth embodiment of a MOPO laser in accordance with the present invention similar to the laser of FIGS. 19A-B but wherein the seed beam is injected into the resonator via grazing incidence reflection from the surface of a prism having a thin film mirror on another surface thereof.

FIGS. 20 and 21 are short beam axis views schematically illustrating thirteenth and fourteenth preferred embodiments 180 and 194 respectively of a MOPO in accordance with the present invention. These inventive MOPOs are similar to the MOPOs of FIGS. 17A-B and 19A-B, respectively, with an exception that a different arrangement is provided for injecting a seed beam (pulse) 28 into the long-resonator power oscillator, and with an exception that optional prism 62 has been omitted. In FIGS. 20 and 21, a master oscillator is not shown.

MOPO 180 has a power oscillator 182 having a linear resonator 184. Resonator 184 is formed between an outcoupling mirror 58 and a thin film reflector (mirror) 186 deposited on a surface 192A of a prism 192. Prism 192 is configured and arranged in the resonator such that adjacent face 192B thereof is at a non-normal incidence angle to a circulating beam, i.e., at an angle to the resonator axis, and such that the beam is normally incident on face 192A, i.e., on mirror 186. Seed beam 28 is incident on prism 192 at an angle such that it is directed into gain chamber 60 along the path of the circulating beam, i.e., the seed beam is incident on the prism at an equal but opposite angle to the angle of incidence of the circulating beam. MOPO 194 has a power oscillator 196 having a linear resonator 198. Resonator 198 is also formed between an outcoupling mirror 58 and a thin film reflector (mirror) 186 deposited on a surface 192A of a prism 192 with seed beam 28 being incident on prism 192 at an angle such that it is directed into gain chamber 60 along the path of the circulating beam.

An advantage of the prism injection arrangement of MOPOs 180 and 194 for a seed pulse, compared with the rear mirror seed-pulse injection arrangement of MOPOs 160 and 170, is that the possibility of feedback to the master oscillator is essentially eliminated. A disadvantage is that the circulating beam in the resonator traverses prism 192 twice per round-trip, and, as a result of this, suffers double optical losses, particularly from reflections at surface 192B, which must be sufficient to ensure adequate beam injection. Those skilled in the art will recognize that a separate, dielectric-coated beamsplitter tilted to the resonator axis could be used for seed beam injection, together with a conventional plane rear mirror, instead of the prism arrangement of FIGS. 20 and 21. However, this may not be as optically efficient as the mirrored prism arrangement. It should be noted that the arrangement of prism 92 could function simultaneously as a wavelength-dispersive element similar to prisms in certain above-discussed embodiments of the present invention. In order for this to occur, however, the prism arrangement would need to be oriented at 90° to the orientation depicted in FIGS. 20 and 21.

Figure 22A:
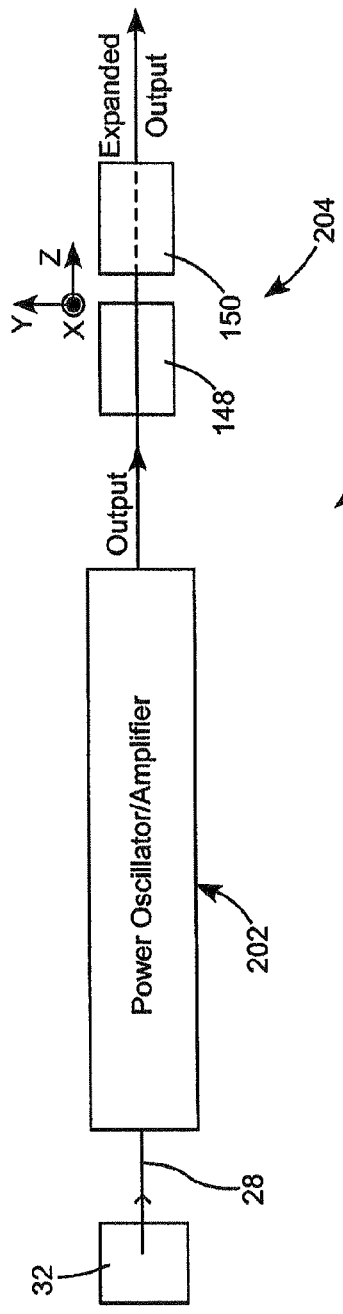
FIGS. 22A and 22B are views, seen in mutually perpendicular axes, schematically illustrating the grazing incidence beam-expanding telescope of FIGS. 17A-B used to expand an output beam delivered by a MOPO/MOPA laser.
Figure 22B:
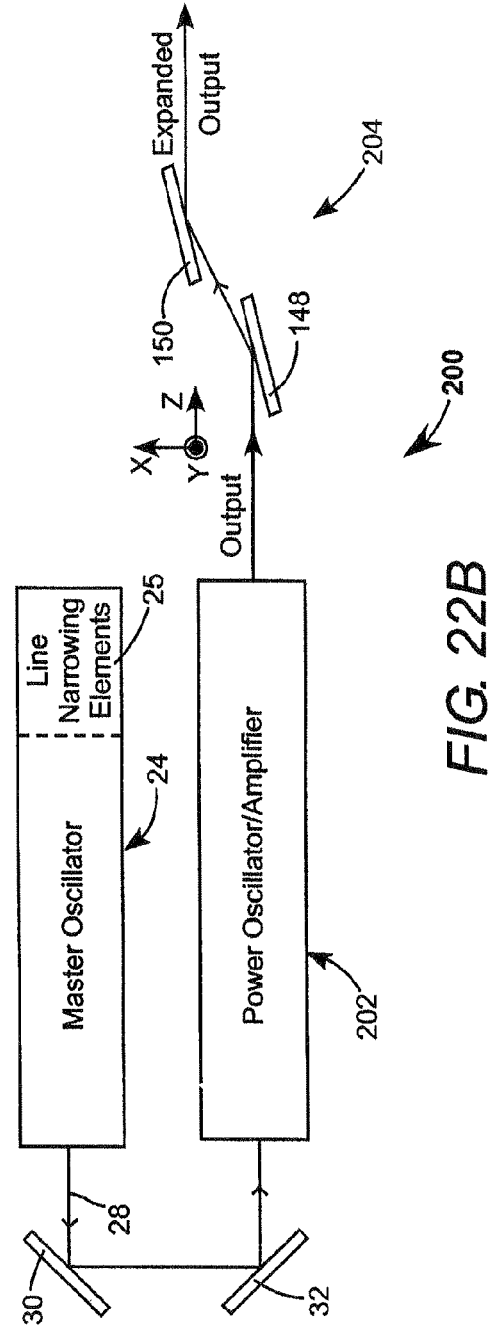

It should be noted, here, that the grazing-incidence telescope arrangement comprising cylindrical mirrors 148 and 150 may be deployed outside of the resonator of a power oscillator for expanding an output beam delivered by that power oscillator before the beam is delivered to other optical elements. FIG. 22A and FIG. 22B are, respectively, long beam axis and short beam axis views schematically illustrating a system 200 including a master oscillator 24 having line narrowing elements 25 and a generic power oscillator 202. Power oscillator 202 may be a ring-resonator or a linear resonator including inventive elements described above, or may be a prior-art power oscillator or even a prior-art power amplifier. The master oscillator delivers a seed beam 28 to the power oscillator as described above. Output radiation is delivered from power amplifier 202 to a grazing incidence telescope comprising cylindrical mirrors 148 and 150 configured and arranged as described above with reference FIGS. 18A-B. The grazing incidence telescope delivers a short-axis expanded beam.

In a MOPO laser system, the optical component, other than the outcoupling device, that usually sees the high laser radiation power density is a window (usually at Brewster's angle to the beam), in the gain chamber of the resonator of the power oscillator. In above-described embodiments of the present invention the gain chamber is gain chamber 60, and chamber windows are not shown for convenience of illustration. In a practical example of a power oscillator in accordance with the present invention a window in the gain chamber closest to the outcoupling mirror (or prism) will receive a laser fluence of between about 50 mJ/cm² and 100 mJ/cm². This can lead to a problem of short lifetime of the window of the gain chamber. A description of optical arrangements for mitigating this window lifetime problem is set forth below with reference first to FIG. 23.

Figure 23:
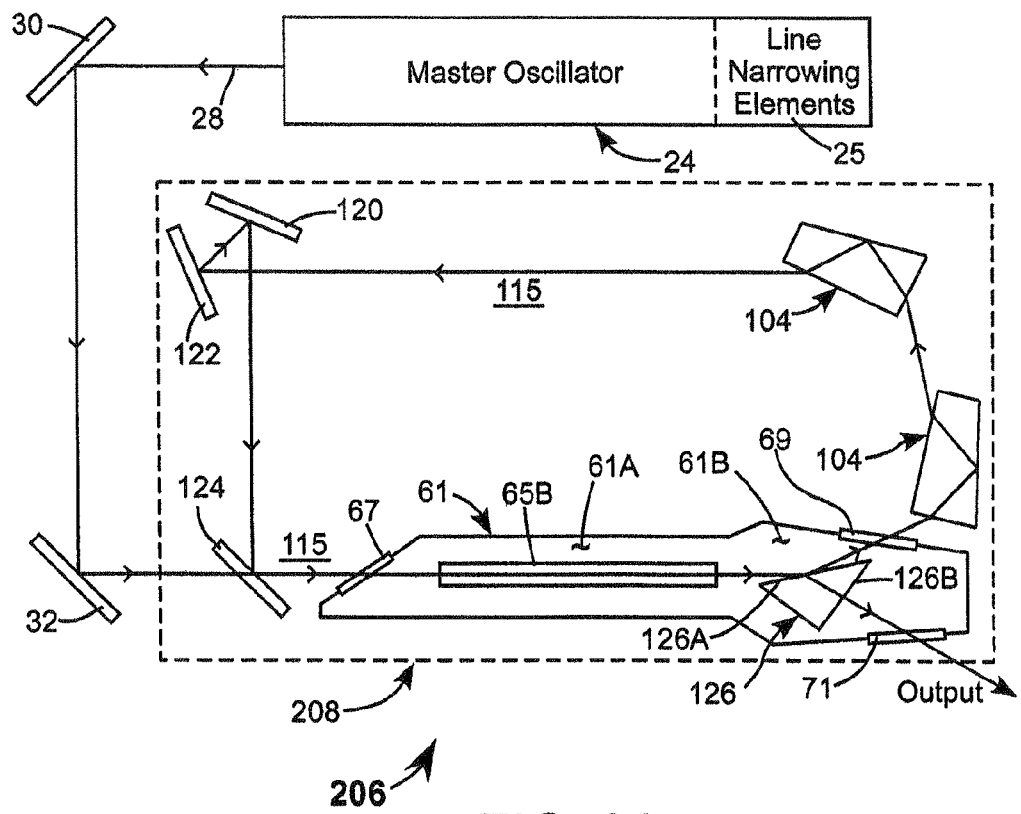
FIG. 23 schematically illustrates a fifteenth embodiment of a MOPO laser in accordance with the present invention, similar to the ring-resonator MOPO laser of FIG. 13, but wherein the triangular prism, having one face thereof serving as a grazing incidence outcoupling mirror, is located in a gain chamber of the power oscillator, and output radiation leaves the gain chamber via a Brewster angle window located therein.

FIG. 23 is a long beam-axis view schematically illustrating a sixteenth embodiment 206 of a MOPO laser in accordance with the present invention. MOPO 206 has a master oscillator 24 including line narrowing elements 25, and a power oscillator 208. Power oscillator 208 has a ring-resonator 115 with optical elements thereof arranged similarly to those of resonator 114 of power oscillator 112 of FIG. 13. Surface 126A of a prism 126 serves as a beamsplitter for coupling a portion of circulating laser radiation out of the resonator as in the above-described resonator. The circulating beam is incident at grazing incidence on surface 126A for expanding the beam and thereby reducing optical fluence on the surface.

In resonator 115 of FIG. 23, prism 126 is located in a gain chamber 61. Gain chamber 61 has a section 61A thereof including discharge electrodes (only lower electrode 65B shown) and a portion 61B thereof including prism 126. A front Brewster angle window 67 is located in section 61A of gain chamber 61. In section 61B, a window 69 is arranged at the Brewster angle to the beam circulating in the resonator, and a window 71 is arranged at the Brewster angle to the output beam after the beam has traversed prism 126 and exited the prism via face 126 thereof.

In resonator 115, the laser fluence on surface 126 is much lower than would be the fluence on a prior-art Brewster angle window in a gain chamber. By way of example, if the grazing incidence angle on surface 126A is 82°, the laser fluence will be about 4.0 times lower than it would be on a Brewster-angle surface. If prism 126 is a CaF$_2$ prism, and the circulating beam has a wavelength of 193 nm (an ArF excimer laser wavelength), Fresnel reflection at surface 126A for p-polarized light is about 30%, and the transmitted (output) portion is expanded to about 5.4 times the width of the circulating beam. This beam expansion, as discussed above, provides that surface 126B of the prism can be at normal incidence or at near normal incidence to the output beam. A small incidence angle from normal, for example about 3.7°, at the surface 126B of prism 126 can reduce the probability of reflecting radiation back into the gain area (not explicitly shown) of gain chamber 61. Providing an antireflection coating on surface 126B can also be helpful in this regard.

Figure 24:
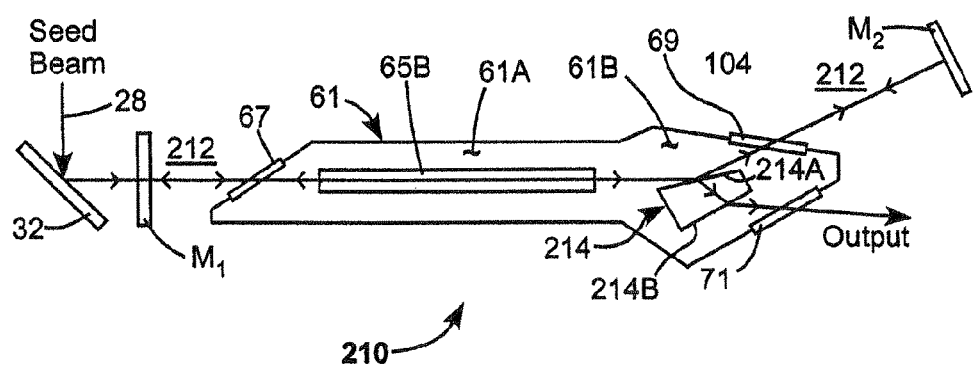
FIG. 24 schematically illustrates one alternative arrangement of the gain chamber of FIG. 23 located in a generic linear resonator.

It should be noted, here, that the gain chamber arrangement of chamber 61 is not limited to use with ring resonator 114 but can be used in other power oscillator ring resonators or in power oscillator linear resonators, whether or not these resonators include any line-narrowing elements or beam-expanding devices in accordance with the present invention. By way of example, FIG. 24 schematically illustrates a power oscillator 210 having a linear resonator 212 including a gain chamber 61. Resonator 212 is formed between mirror M$_1$ and M$_2$ and is intended to represent simply any "generic" linear resonator. A seed beam 28 is reflected from mirror 32 into resonator 212 via mirror M$_1$ thereof. Although gain chamber 61 of FIG. 24 is somewhat different in shape from gain chamber 61 of FIG. 23, and has a different outcoupling device, the same reference numeral is used for the chamber and common components thereof. In gain chamber 61 of FIG. 24, a prism 214 functions as an outcoupling device. Surface 214A of the prism is at grazing incidence to the circulating beam. Prism angles are arranged such that an output beam traversing the prism exits the prism at the Brewster angle to surface 214B thereof. This eliminates any possibility for back reflection of radiation into the gain chamber and any need for an antireflection coating on surface 126B. Windows 69 and 71 are arranged at the Brewster angle to the circulating beam and the output beam, respectively.

In summary, the present invention is described above with reference to a preferred and other embodiments. The invention, however, is not limited to the embodiments described and depicted. Rather, the invention is limited only by the claims appended hereto.

What is claimed is:

1. A laser system, comprising:
   a master oscillator for generating a beam of laser radiation, said master oscillator including line narrowing elements for limiting the bandwidth of the beam of radiation; and
   a power oscillator arranged to receive and amplify said laser radiation beam, said power oscillator having optical elements defining a resonator, said resonator including a gain medium and wherein said power oscillator further includes at least one prism arranged for expanding the beam for reducing the power density on the optical elements of the resonator in order to reduce optical damage.

2. A laser system as recited in claim 1, wherein the resonator of the power oscillator is a ring resonator.

3. A laser system as recited in claim 1, wherein the resonator of the power oscillator is a linear resonator.

4. A laser system as recited in claim 1, wherein the resonator of the power oscillator includes an input coupler for coupling radiation from the master oscillator into the power oscillator.

5. A laser system as recited in claim 4, wherein said input coupler also functions as an output coupler.

6. A laser system as recited in claim 5, wherein the resonator of the power oscillator is a ring resonator.

7. A laser system as recited in claim 1, wherein a pair of prisms are used to perform the beam expanding function.

8. A laser system, comprising:
   a master oscillator for generating a beam of laser radiation, said master oscillator including line narrowing elements for limiting the bandwidth of the beam of radiation; and
   a power oscillator arranged to receive and amplify said laser radiation beam, said power oscillator having optical elements defining a ring resonator, said resonator including a gain medium and wherein said power oscillator further includes a pair of prisms arranged for expanding the beam for reducing the power density on the optical elements of the resonator in order to reduce optical damage.

9. A laser system as recited in claim 8, wherein the resonator of the power oscillator includes an input coupler for coupling radiation from the master oscillator into the power oscillator.

10. A laser system as recited in claim 9, wherein said input coupler also functions as an output coupler.

11. A laser system, comprising:
   a master oscillator for generating a beam of laser radiation, said master oscillator including line narrowing elements for limiting the bandwidth of the beam of radiation; and
   a power oscillator arranged to receive and amplify said laser radiation beam, said power oscillator having optical elements defining a resonator, said resonator including a gain medium and wherein said power oscillator further includes means for expanding the beam for reducing the power density on the optical elements of the resonator in order to reduce optical damage.

12. A laser system as recited in claim 11, wherein said means for expanding the beam includes at least one grazing incidence mirror.

13. A laser system as recited in claim 11, wherein said means for expanding the beam includes a pair of prisms.

14. A laser system as recited in claim 11, wherein the resonator of the power oscillator is a ring resonator.

15. A laser system as recited in claim 11, wherein the resonator of the power oscillator is a linear resonator.

16. A laser system as recited in claim 11, wherein the resonator of the power oscillator includes an input coupler for coupling radiation from the master oscillator into the power oscillator.

17. A laser system as recited in claim 16, wherein said input coupler also functions as an output coupler.

18. A laser system as recited in claim 17, wherein the resonator of the power oscillator is a ring resonator.

* * * * *